US007016781B1

(12) United States Patent
Wolfson

(10) Patent No.: US 7,016,781 B1
(45) Date of Patent: Mar. 21, 2006

(54) METHOD AND SYSTEM FOR QUERYING IN A MOVING OBJECT DATABASE

(75) Inventor: Ouri Wolfson, Highland Park, IL (US)

(73) Assignee: Board of Trustees of the University of Illinois, Chicago, IL (US)

(*) Notice: Subject to any disclaimer, the term of this patent is extended or adjusted under 35 U.S.C. 154(b) by 0 days.

(21) Appl. No.: 11/048,039

(22) Filed: Jan. 31, 2005

Related U.S. Application Data

(63) Continuation of application No. 10/074,903, filed on Oct. 29, 2001, now Pat. No. 6,895,329.

(60) Provisional application No. 60/243,839, filed on Oct. 30, 2000, provisional application No. 60/292,322, filed on May 22, 2001.

(51) Int. Cl.
*G01C 23/00* (2006.01)
*G06F 19/00* (2006.01)

(52) U.S. Cl. ............... 701/209; 701/201; 701/205; 701/210; 340/988; 340/995.23; 707/3

(58) Field of Classification Search ............. 701/201, 701/209, 202, 204, 205, 210, 211; 340/988, 340/990, 991, 992, 993, 995.23; 707/3, 4, 707/5
See application file for complete search history.

(56) References Cited

U.S. PATENT DOCUMENTS 6,662,105 B1 * 12/2003 Tada et al. ............. 701/209
6,791,472 B1 *  9/2004 Hoffberg ............... 340/905

* cited by examiner

*Primary Examiner*—Tan Q. Nguyen
(74) *Attorney, Agent, or Firm*—McDonnell Boehnen Hulbert & Berghoff LLP.

(57) ABSTRACT

A database receives location information about a moving object. Using the destination of the object and an electronic map, the database finds a projected path for the moving object. From the projected path, the database computes a trajectory. The trajectory may be used to estimate past and future positions of the moving object. The moving object may send location updates to the database when its actual location differs from its anticipated location by more than an uncertainty threshold.

26 Claims, 12 Drawing Sheets

METHOD AND SYSTEM FOR QUERYING IN A MOVING OBJECT DATABASE

RELATED APPLICATIONS

This application is a continuation of U.S. patent application Ser. No. 10/074,903, filed Oct. 29, 2001, now U.S. Pat. No. 6,895,329, which claims the benefit of both U.S. Provisional Patent Application No. 60/243,839 filed Oct. 30, 2000, and U.S. Provisional Patent Application No. 60/292,322 filed May 22, 2001. U.S. Provisional Patent Application No. 60/243,839 filed Oct. 30, 2000, U.S. Provisional Patent Application No. 60/292,322 filed May 22, 2001, and U.S. patent application Ser. No. 10/074,903 are all incorporated herein by reference in their entirety.

GOVERNMENT RIGHTS

This invention was made with government support under grant numbers ITR-0086144, CCR-9816633, CCR-9803974, IRI-9712967 and INT-9812325 sponsored by the National Science Foundation, and DAAL01-96-2-0003, mods 18 and 34, sponsored by the Army Research Laboratories. The government may have certain rights in this invention.

BACKGROUND

1. Field of the Invention

This invention relates to tracking moving objects. More specifically, it relates to using past location and future destination information to compute an expected trajectory of a moving object.

2. Description of Related Art

Common devices such as cell phones, personal digital assistants, laptops and the like, can be equipped to provide location information. These devices are generally also equipped for wireless transmission of data. The device's location is updated using positioning technologies. Examples of positioning technologies include 1) global positioning systems, commonly called GPS, 2) network based positioning, which computes the location of a device by triangulation of its wireless signal between transmission towers, 3) a fixed sensor in the environment that identifies the moving object, and 4) cell-identification, which identifies the cell in which the moving object is located.

The devices can be carried by, or mounted on, moving objects such as vehicles, aircraft, vessels or pedestrians. The location of the small device corresponds directly to the location of the larger device. Using the wireless capability of the devices, the location is transmitted to a central system for tracking the motion of the moving object. The central system typically stores the location information of the object, and provides a method for displaying that information to a user.

Location information management involves tracking the moving object, modeling its location (for example, by representing it in a server) and retrieving data. Existing systems perform location management by receiving a time-location point. This point is typically of the form (x,y,t), and it is generated periodically by the device and transmitted to the location management system. This may occur, for example, once every 10 minutes. The point indicates the object's coordinates (x,y) at time t.

The location management system is typically a database managed by a Database Management System (DBMS). The database provides interfaces for receiving the location information and for displaying the information to users. When the DBMS receives a location point, it stores it in the database. The DBMS supports Structured Query Language (SQL), which can be used to access and query the information stored in the database. In these systems, if the exact current location of a moving object is required at a particular time, then the object is contacted, its location is retrieved, and the result is stored in the database. The method is called point-location management, and it has several disadvantages.

First, point-location management does not allow interpolation or extrapolation of data. In point-location management, the system only knows the time-location points stored in its database. It cannot interpolate the past position of a moving object, for example at time X, using data sets subsequent to that time. Also, it cannot extrapolate a future location of the moving object from past data sets. In addition, the point-location management system has difficulty determining the current location of all its moving objects. Since the system does not support extrapolation, to find the current location of its moving objects the system must simultaneously poll each moving object. This causes an undesirable bandwidth spike on the network as the system attempts to contact each object. Objects disconnected from the network are not polled, and their location will not be known.

A second disadvantage is that point-location leads to a tradeoff between precision and resources. Obtaining an accurate picture of moving objects' precise locations requires frequent location updates. This consumes limited system resources such as bandwidth and processing power. When these resources are not taxed by frequent location updates, the location information quickly becomes dated and, therefore, imprecise.

A third problem of point-location management is that it leads to cumbersome and inefficient software development. This creates several problems for developing location based service applications. Existing DBMS's are not well equipped to handle continuously changing data, such as the location of moving objects, because in existing databases data is assumed to be constant unless it is explicitly modified. Location based service applications also need to manage space and time information; however, SQL is not designed or optimized for these types of when/where queries. For example, the query "retrieve the vehicles that are inside the region R always between 4 pm and 5 pm" would be extremely difficult to express in SQL.

Additionally, moving object locations are inherently imprecise because the database location of the object (i.e., the object location stored in the database) cannot always be identical to the actual location of the object. This inherent uncertainty impacts database modeling, querying and indexing. For example, there can be two different kinds of answers to queries. These are the set of object that "may" satisfy the query, and the set of objects that "must" satisfy the query. These queries aren't supported in current point-location DBMS's. Furthermore, existing DBMS's have no parameters to account for varying levels of uncertainty, such as was that truck within 100 inches, 100 feet, 100 yards, or 100 miles of an intermediate point calculated.

Therefore, there exists a need to more accurately represent the travel paths of moving object and to predict the future movement of objects. There further exists a need to allow complex queries regarding the past and future locations of moving objects.

SUMMARY

A database system receives location information from a moving object. The object may be a vehicle, aircraft, pedestrian or some other object. Using the object's destination and a past known location, the system estimates the object's current location. The estimation is done by constructing and maintaining a trajectory of the moving object. Using the trajectory, the system can also estimate past or future locations.

The moving object periodically transmits its location to a moving object database (MOD). The moving object database receives and stores the time and location of the moving object. An electronic map, which contains travel time and distances for permissible travel paths, is also stored in the database. Destinations of the moving object are inputted into the system. Using the electronic map, the system finds the shortest path from the current location of the moving object to its destination. The system then converts the path into a trajectory.

The trajectory may be maintained by updating it to account for location updates of the moving object. It may also be updated to account for changes in travel conditions. These may be received, for instance, from websites that provide real-time traffic conditions. A traffic incident model identifies trajectories affected by traffic incidents, and it provides a method of updating a trajectory to account for delays caused by traffic incidents.

The trajectory may be sent from the database to the moving object. Using the trajectory, the moving object may extrapolate its anticipated position from the trajectory. The moving object compares its anticipated position to its actual position and provides an updated location to the moving object database when the difference between the two positions exceeds a specified threshold. The moving object database then computes a new trajectory using the new location information, and it sends this information back to the moving object.

The system also defines a set of operators that can be used to query trajectory data in the moving object database. For example, a query might find the objects that will be within 1 mile of a certain location at a given time. The operators may also be used to notify a user when specific condition occurs. For example, a user may be notified when an object is expected to be late by more than one hour. The operators can be incorporated into the traditional SQL query language, which has been widely adopted by many commercial database systems. The new operators allow for the development of complex spatial and temporal applications.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
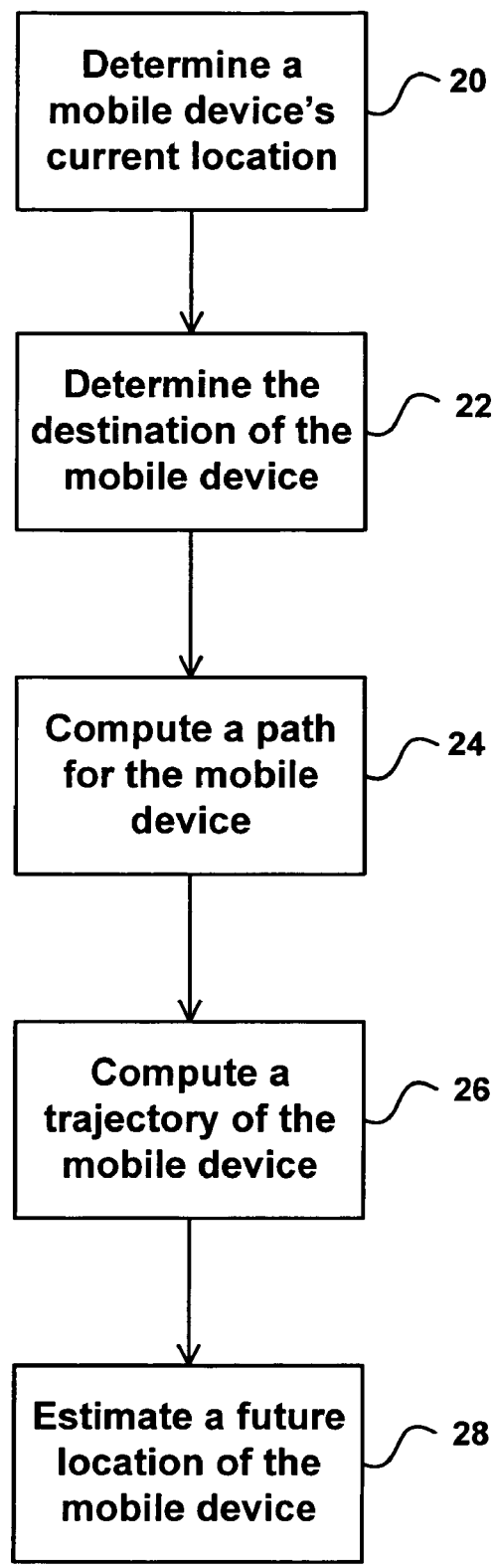
FIG. 1 is a flowchart of the mobile object database system's operation.

FIG. 1 shows a high-level flowchart of a mobile object database system. The database system tracks the location of mobile objects. The system creates a trajectory for the mobile object, and using the trajectory, the database can predict the location of the mobile device at times when the actual location is not known. The trajectory may be used to estimate the location of the mobile object at a future time, or it may be used to estimate the object's location at a past time.

At Step 20, the database begins by determining a mobile device's current location. This may be done, for example, by receiving a GPS location sent wirelessly from the mobile object. Next, the database determines the destination of the mobile device 22. A user may input the destination into the database, or the destination may be obtained from the mobile device.

Once the database knows the current location of the device and the device's destination, it computes a path 24 that the mobile object will use to travel between its current location and its destination. The path may be determined in a variety of ways, but in a preferred embodiment the database expects the mobile object to travel on the shortest path between its current location and its destination. Electronic maps containing distances and travel-times along the distances can be used to determine an object's path.

At Step 26 the database computes a trajectory of the mobile device. The trajectory may be a sequence of points that represents the time-based movement of the object along its project path. The travel-times stored in the electronic map are used in creating the time-based trajectory. The trajectory can be simplified to reduce the number of segments it contains. This may be done, for example, by using line simplification.

The database also receives real-time traffic updates. The updates can come, for example, from websites that provide real-time traffic information. Various traffic incidents, such as accidents and rush hour, can affect the travel-times on road segments. A traffic incident model allows the database to compensation for varying traffic conditions when computing the trajectory. The updates from a traffic website indicate the severity associated with a traffic incident. Using the severity, the traffic incident model estimates the duration of the traffic incident and its effect on travel times.

The trajectory can be recomputed by the database during the travel of the moving object. For instance, when the database receives information about a traffic incident, the database may recompute the object's trajectory to account for the changes in travel-times caused by the incident. Additionally, each segment on the trajectory may have an uncertainty threshold associated with it. The uncertainty threshold can reflect the maximum tolerable deviation of the object from its expected path. By sending the trajectory, including the uncertainty to the moving object, the moving object can compute its expected location and its actual location. If the difference between these locations exceeds the uncertainty threshold, then the device sends an updated location to the database. The database then uses the updated location to recompute the trajectory in order to more accurately reflect the travel of the moving object.

After an object's trajectory is computed and stored in the database, a new set of time-location-based queries can be used to access the data. The database can query the trajectory information to estimate the future location of a moving object 28 when its actual location is not known. Using the trajectory, the database can also estimate the past or present location of an object when the object's actual location at that time is not known. The database can also perform more complex queries, for example, determining which moving objects will be in a given region during a specified time.

The flowchart of FIG. 1 depicts a high-level description of the database system's operation. The description of FIG. 1 is not meant to cover all the possible variations and additions that can be made to the database system. Other changes and modifications may also be made.

The mobile device may communicate with the database system to exchange location, trajectory or other information. While the mobile device can communicate with the database through a wired connected, in a preferred embodiment the mobile device communicates wirelessly with the database. A variety of devices are available that utilize wireless communications to send and receive information. Cellular phones, personal digital assistants (PDAs), laptop computers and other application specific devices may all be equipped for wireless communications. By connecting to a cellular wireless network, these devices can connect to the public switched telephone network (PSTN) or ultimately interface with the Internet. It is also possible to communicate as a part of other wireless networks.

Wireless communications can occur according to a number of various standards and signaling methods. Code division multiple access (CDMA) is a commonly employed standard for wireless networks. Geographic areas are generally divided into cells. The wireless devices communicate, using the appropriate standard, with a base station in their cell. The base station connects to the PSTN, which can then also provide connectivity to the Internet. When the device moves to another cell, a handoff procedure occurs. The wireless device then communicates with a different base station located in the new cell. The connection is transferred to the new base station without interruption, and the handoff appears transparent to the user. This way a device may move seamlessly through multiple cells during one call.

Figure 2:
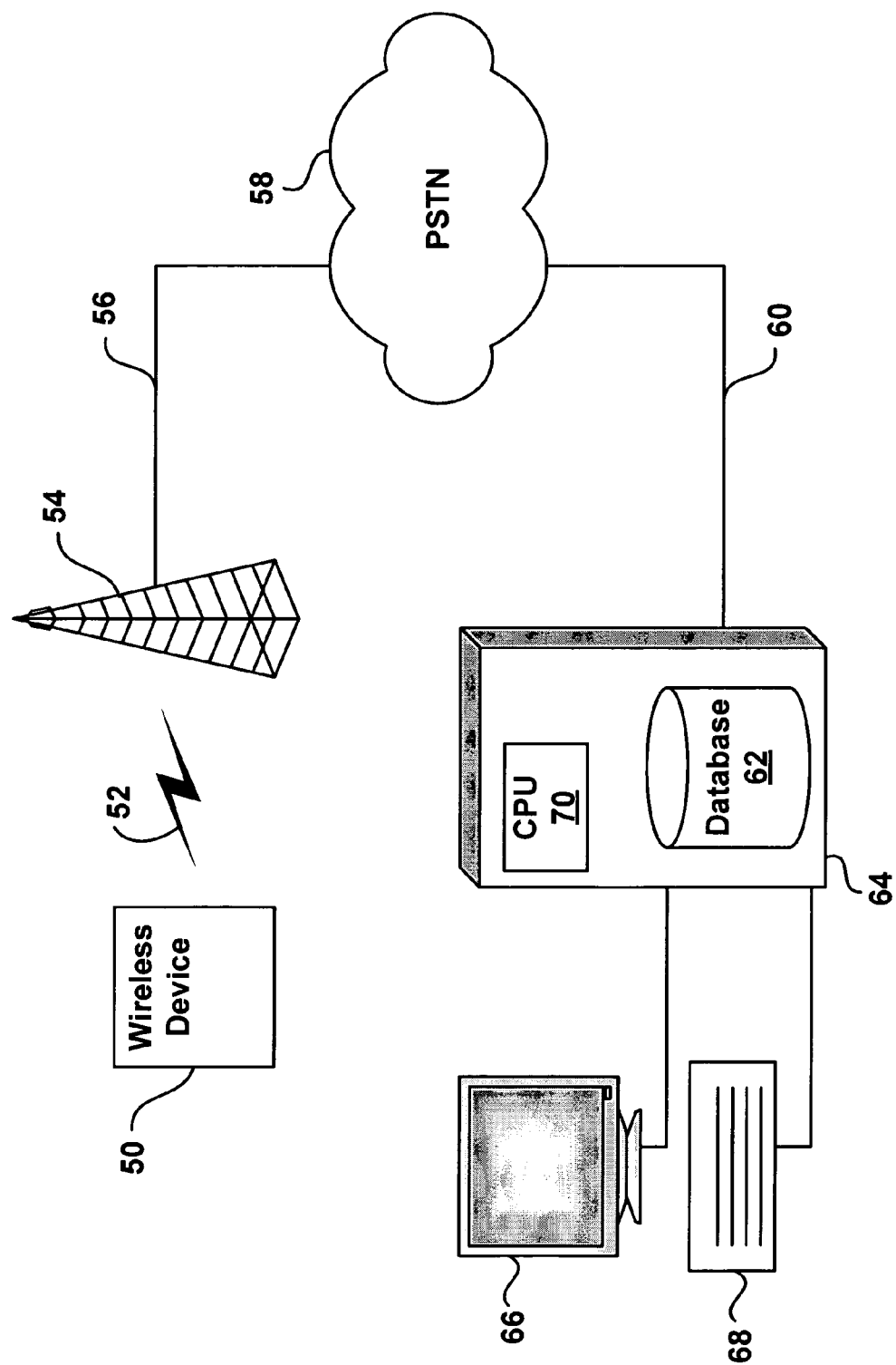
FIG. 2 shows a connection between a wireless device and the database.

FIG. 2 shows an implementation of a connection between a wireless device 50 and a database 62. The wireless device 50 transmits a wireless signal 52 to a base station 54. In a preferred embodiment, the wireless device 50 is part of a cellular wireless network. The communication between the wireless device 50 and the base station 54 occurs according to the standard for wireless communications used in that area. This may be, for example, code division multiple access (CDMA).

The base station 54 provides connectivity to the PSTN, shown generally by 58, through a link 56. The signal 52 from the wireless device 50 is received at the base station 54 and sent via the link 56 to the PSTN 58. The signal 52 is routed through the PSTN 58 to the database 62. The database 62 runs on a computer 64. The computer is coupled to a monitor 66, for displaying output, and a keyboard 68, for receiving input. Many different variations to the computer 64 are possible, and additional or less equipment may be attached to the computer 64. Generally, the computer 64 contains a central processing unit 70 for executing instructions and memory for storing data. The computer 64 connects to the PSTN 58 using a modem or other interface device. The resulting connection of the wireless device 50 and the database 62 through the PSTN 58 may be a circuit switched connection or a packet switched connection.

Figure 3:
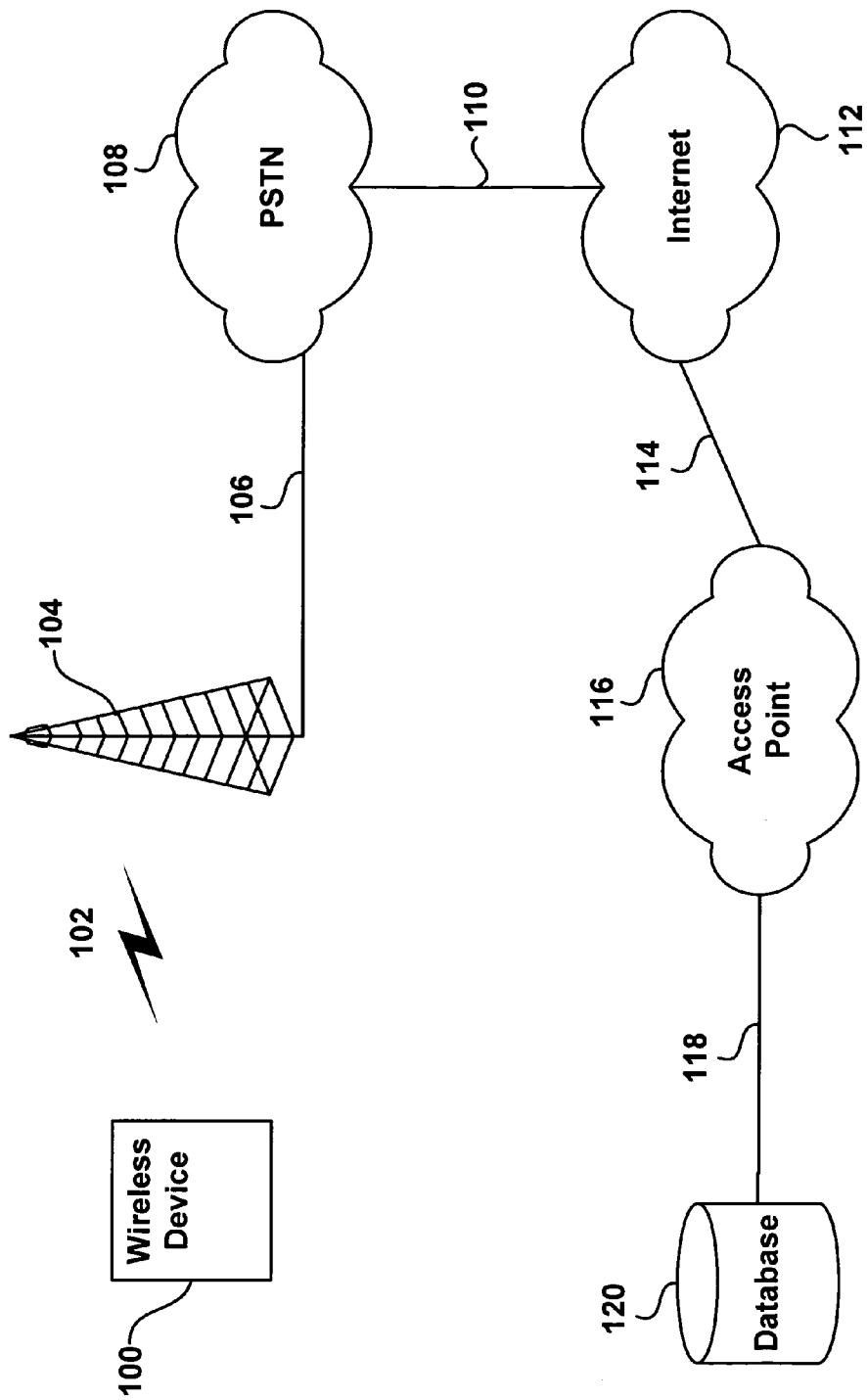
FIG. 3 shows an alternate connection between a wireless device and the database.

FIG. 3 shows another configuration for connecting between a wireless device 100 and a database 120. The wireless device 100 sends a wireless signal 102 to a base station 104. Preferably the wireless device 100 and the base station 104 are part of a cellular wireless network. The communication between the wireless device 100 and the base station 104 occurs according to one of the communications standards employed in that area. The base station 104 connects via a link 106 to the PSTN 108. Through the PSTN 108, the wireless device connects to the Internet, shown generally by 112, via link 110.

The database 120 typically runs on a computer (not shown). The computer may contain one or more processors for performing computations. It also generally contains both volatile and non-volatile memory, which are used in performing computations and in data storage. The database 120 may run as a software program on the computer, and the computer may also run other programs. A database may also be implemented in other ways, for instance, it may be distributed across more than one computer, or it may run on dedicated hardware. Other ways also exist.

The computer may also be connected to the Internet 112. FIG. 2 shows the database 120 connected to an access point 116 via a link 118. The access point 116 provides connectivity to the Internet 112 through a link 114. In one embodiment, the computer may be equipped with a modem. The access point 116 may be the PSTN 108. The modem would dial into the access point 116 and connect to the Internet 120 through the access point 116. In another embodiment, the computer is equipped with a network interface card (NIC). The computer connects via a link 118 to the access point 116, which may be a network service provider. The access point 116 then interfaces the computer with the Internet 112. Using this setup, the computer may establish a PPP or TCP/IP connection with the Internet 112.

In a preferred embodiment each device 100, 120 connected to the Internet is assigned an IP address. The address is usually unique to each device 100, 120. The devices 100, 120 communicate over the Internet 112 using an established protocol such as IPv4. They transmit packets of information that are routed to the appropriate device based on the device's IP address. This allows communication between the wireless device 100 and the database 120 via the Internet 112.

One skilled in the art will recognize that a variety of other ways exist to establish a connection between the wireless device 100 and the database 120.

A wireless device may also be equipped to obtain its location. One common way of obtaining location information is through the use of the Global Positioning System (GPS). Another method is network based positioning, which computes the location of a device by using three or more transmission towers to triangulate the device's wireless signal. A fixed sensor in the environment may be used to identify the moving object and determine its position. Various other ways also exist to determine the location of a device.

Once the location of a wireless device is obtained, it can be transmitted, through the wireless network, to a central point. The central point can be a database, or other system, which stores and tracks the location of the wireless device. The small wireless devices may also be coupled to larger objects, such as airplanes, trucks, cars, bicycles, pedestrians or others. By tracking the location of the smaller wireless device, the location of the larger object can be accurately determined. Using this technique, it is possible to establish a system to track one or more large objects.

In one embodiment a system to track the flight patterns of commercial aircraft is established. A central authority, for instance the air traffic controllers at an airport, may track the location of all the aircraft in a particular area. Alternatively, a particular airline may track all its planes in a geographic area. In another embodiment, a shipping company may track the location of its trucks. In yet another embodiment, a delivery service may track the location of its mobile carriers. A plethora of other applications exist for tracking the location of objects.

In a preferred embodiment, the location information is transmitted from the wireless device to a database system. The database system uses trajectory location management to store and process the location data. First, the current location of the object is determined. This may be done using any of the previously discussed methods, such as GPS. The location information may be obtained directly from the wireless device through the connection with the database.

In another embodiment, the location information is transmitted from a source other than the wireless device to the database system. For example, a central authority can track the locations of cellular phones. The database may obtain the location of a cell phone from the central authority instead of directly from the cell phone. This method is not limited to cell phones, but may be applied to any other device whose location may be tracked by an external source.

Next, the destination of the moving object is determined and inputted into the database. The destination may be obtained by the database using a variety of different means. A user may manually enter the information into the database. This may be the case where a shipping company enters the known route of one of its trucks, or where known flight plans of airplanes are entered into the database. The input may also occur automatically. This may be the case, for instance, where a computer automatically generates a truck route for a shipping company. The computer may be linked to the database and automatically provide the truck route to the database. It is also possible for a remote user to enter in the destination. For instance, the driver of a truck may manually enter his next destination into the wireless device, which then transmits it to the database. The information can also be obtained from a user's electronic calendar. For example, the database can obtain a user's schedule from the user's PDA. Using the schedule, the database may determine that at 9:45 am the user is traveling to the destination of his 10:00 am meeting.

The destination may be a single location. For instance, a non-stop flight between Los Angeles and Orlando would have a single destination. The destination may also be a list of destinations. This would be the case for a delivery truck that makes several stops on its daily route.

The database system stores an electronically coded map. The map is typically coded with distance and travel-time information for available road sections. A road section may have one travel time associated with it, or it may have more than one travel time associated with it. The map may provide multiple travel times for a road section to take into account changes in travel conditions that occur throughout the day. The map information can be inputted into the database for use in computing trajectories.

In one embodiment, the map is a graph, represented as a relation where each tuple corresponds to a block with the following attributes:

POLYLINE: each block is a polygonal line segment. POLYLINE gives the sequence of the endpoints (x1, y1),(x2,y2) . . . (xn,yn).
LENGTH: the length of the block
FID: the block ID number.
SPEED: speed limit along the block.
L_F_ADD: left side from street number.
L_T_ADD: left side to street number.
R_F_ADD: right side from street number.
R_T_ADD: right side to street number.
ZIPL: left side zip code.
ZIPR: right side zip code
ONE_WAY: a Boolean one way flag
METERS: length of the block in meters
DRIVE_TIME: typical drive time from one end of the block to the other, in minutes.

The attributes L_F_ADD, L_T_ADD, R_F_ADD, R_T_ADD, ZIPL, ZIPR, and METERS are geo-coded attributes, which may be used to translate between a coordinate and an address, such as "1030 North State Street." These types of maps are available from commercial vendors, such as Geographic Data Technology Co. Other vendors also provide maps. Many different formats may be used to store the map data, and a map may provide additional or less data than the above example.

In addition, it is possible to construct a new map for use in the database system, or to obtain the information from other sources. For instance, the travel-times for road segments may be obtained separately from the map. They may come from a different source and be specific to the road segments on the map, or the travel times may be estimates based on the type of road (i.e., interstate, city street, etc. . . . ), the time of day (i.e., late night, rush hour, etc. . . . ) or other factors. The database may use a single map for a travel area, or it may use a series of maps.

In another embodiment, the system tracks the location of airplanes or other flying objects. The map may not correspond to road segments since the sky doesn't have actual roads, but it may correspond to known flight patterns or travel ways. The travel-times along flight paths in the sky may be dependent on the type of aircraft and on weather conditions. For instance, a headwind or a tailwind may alter the flying time of a particular segment along a flight path. A storm may alter the flying times or the flight paths of a flying object. The database may receive real-time weather updates and adjust the trajectories to account for these changing conditions.

The database computes the path of the moving object using the map. The path is specified by giving the starting address or (x,y) coordinate, the start time, and the destination address or (x,y) coordinate. The path may be computed using an external routine, which takes into account various factors that will be discussed later. The path is then a sequence of blocks (edges), i.e. tuples of the map. The endpoint of one block POLYLINE is the beginning point of the next block POLYLINE. Using the path and the trip's starting time, a trajectory may be computed. The DRIVE_TIME attribute may be used to determine the time at which the object will reach the end of each poly-line segment on the path.

In a preferred embodiment, the database computes the shortest path between the object's current location and the destination. The shortest path may be based on different factors. In one embodiment, the shortest path represents the path that takes the least amount of time to travel. In another embodiment the shortest path is the path the covers the least distance. For an object with multiple destinations, additional paths are computed between subsequent destinations. The optimal path can be computed using multi-stop routing software.

In another embodiment, the database computes the expected paths based on other criteria. For instance, an object may travel on a known path for one or more legs of a journey. The known information may be entered into the database for use in generating the path information. Other restrictions, such as not traveling on toll roads or only traveling on major highways, may also be considered in computing the object's travel path. Additionally, historical data can be used to determine the path of an object. These additional considerations may cause the path to deviate from the shortest between the two points.

In yet another embodiment, the database system sends the current location and the destination information to another site, which computes the path and provides the path back to the database. The remote site may be another database system linked to the moving object database through the Internet or through some other connection. A commercial vendor may provide the remote site, or it may be a part of the database system distributed across one or more other computers.

Roads and other travel ways are often non-linear. While it is possible to represent the path as a compilation of non-linear segments, in a preferred embodiment, the database represents the path as a compilation of linear segments. The map preferably represents the travels ways as linear segments; however it is possible to use a map containing non-linear segments when developing the path. Using a map containing linear segments, a linear path may be generated directly; however, when using a map containing non-linear segments, the non-linear segments may be stored in the database to represent the path, or they may be converted into linear segments for the database representation.

The path can be represented to a high degree of precision using only straight lines. Decreasing the maximum length of the lines correspondingly increases the number of line segments used to represent a distance. An increase in the number of lines representing a distance allows a more accurate depiction of the actual travel path, thereby increasing the precision of the representation; however, using more line segments to represent the path increases the complexity of the representation. More resources may be needed to store the representation, and using a greater number of line segments may decrease the system's speed.

In a preferred embodiment, the shortest path is presumed to be the route that the moving object follows. The database converts the path, which was determined using the electronic map, into a trajectory. The trajectory may be a sequence of straight-line segments (x1,y1,t1), (x2,y2,t2), . . . , (xn,yn,tn) in 3-dimensional space. The times may be determined using the average travel speeds of the road sections in the electronic map. The database models the motion of the object by progressing it along the travel path. The object starts at a location having coordinates (x1,y1) at time t1, and it moves on a straight line at a constant speed to the next coordinate. The object reaches location (x2,y2) at time t2. Then it moves on a straight line at a constant speed and reaches location (x3,y3) at time t3. This process continues until the object reaches its final destination. In a preferred embodiment, the trajectory is continuous; however, it is possible that gaps can exist in the trajectory so that it may not be possible to compute an object's expected location at every point between its beginning and ending locations.

The trajectory of the object may be stored as the sequence of coordinates. The trajectory approximates the expected motion of the object in space and time. It is an approximation, because the object does not ordinarily move in straight lines and at constant speeds. However, increasing the number of straight lines in the representation, the approximation can be accurate up to an arbitrary precision. The number of line segments on the trajectory impacts the performance and precision of queries and triggers on the data. The performance increases, and the precision decreases, as the number of line segments decreases. Conversely, the performance decreases, and the precision increases, as the number of line segments increases.

The number of line segments on each trajectory can be adjusted using a variety of different methods. In one embodiment, adjacent line segments that have the same travel speed and direction are coalesced. This decreases the total number of line segments. A preferred embodiment uses line simplification to adjust the number of line segments on the trajectory. In line simplification, a new set of line segments connects the endpoints of the original trajectory. The new set of line segments is such that each point on the original trajectory is not further that some given distance from a point on the new set of line segments. The simplification may be performed on the trajectory to decrease the number of line segments. It may also be performed before computing the trajectory. For instance, the path may be simplified before it is converted into the trajectory.

The trajectory is stored in the database and may also be stored on board the moving object. At any point in time t between $t_i$ and $t_{i+1}$, the database can compute the expected location of the moving object at time t. This method allows for both interpolation and extrapolation. The database can compute the expected location of the moving object at any point in time between the start and end times of the trip. For example, if it is known that the object is at location (x5,y5) at 5 pm and at location (x6,y6) at 6 pm, and it moves in a straight line at constant speed between the two locations, then the location at 5:16 pm can computed any time. The computation can occur before 5:16 pm (e.g., extrapolation), or after 5:16 pm, (e.g., interpolation).

An uncertainty may also be associated with each line segment on the trajectory. The uncertainty corresponds to the tolerance of the system to deviation of the actual location from the expected location. For each point, the associated uncertainty represents an area in which the moving object may actually travel. This area may be in one dimension, or may be in two dimensions.

In a preferred embodiment, each line segment in the trajectory has its own uncertainty. It is possible, however, to vary the uncertainty along a line segment. The uncertainty may vary with location, or it may vary with time. Other factors may also be used to vary the uncertainty.

Figure 4:
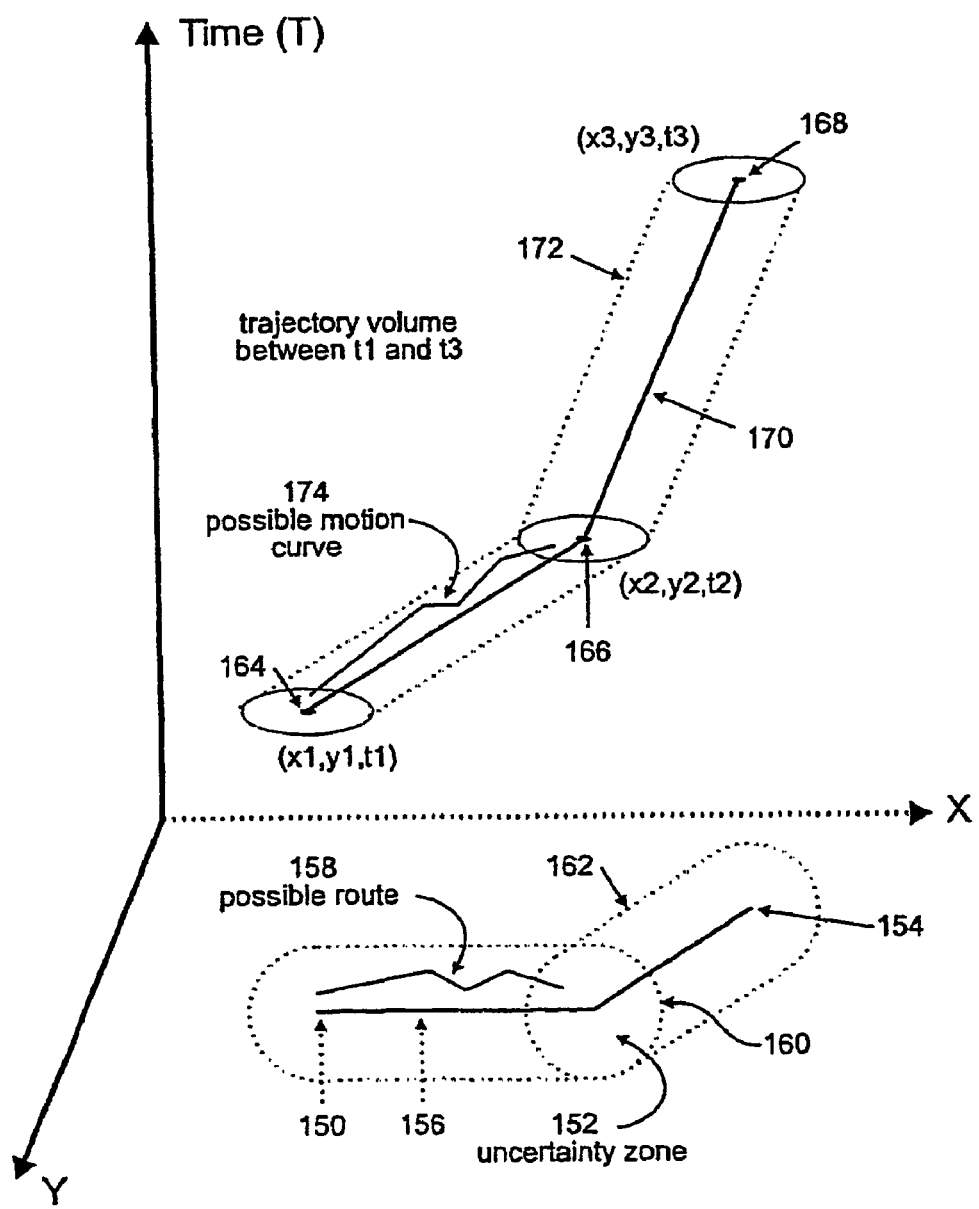
FIG. 4 illustrates a 3D uncertainty volume associated with a trajectory and a 2D projection of the uncertainty volume.

FIG. 4 illustrates a two-dimensional uncertainty 162 associated with a trajectory 156. Three points 150, 152, 154 generate the trajectory. The continuous trajectory is the solid line, indicated generally by 162. The moving object is anticipated to travel along the trajectory 156 from the first point 150 to the second point 152 and then to the third point 154. Each point along the trajectory has associated with it an uncertainty. At point two 152, the uncertainty is shown by a circle 160. The dashed lines, shown generally by 162, indicate the outer bounds of the uncertainty. The uncertainty is the area created by progressing a circle of radius r along the entire length of the trajectory 156. The moving object ideally travels along the trajectory 156, but it actually may travel on any path inside the uncertainty 162. One possible path is shown at 158.

FIG. 4 also illustrates the three-dimensional uncertainty 162 used to create the two-dimensional projection. The 3D first point 164 projects to the first point 150. The second 3d point 166 projects to the second point 152, and the third 3D point 168 projects to the third point 154. The 3D trajectory 170 connects the three 3D points 164, 166, 168. The possible motion curve 174 represents part of a possible path traveled by the moving object. This projects into two dimensions to create the possible path 158. The three-dimensional uncertainty volume 172 projects into two dimensions to create the two-dimensional uncertainty 162.

Uncertainties may be implemented in the database by representing a trajectory point as a five dimensional point. The trajectory point (xn, yn, tn, rn, dn) contains the location on the map (xn, yn) and the time (tn) that the object is expected to be at that point. The value (dn) represents the dimensionality of the uncertainty, and the value (rn) represents the deviation threshold. When the value of dn is one, the dimensionality is one and rn represents the permissible deviation in that dimension. For a dn value of two, the deviation threshold is two-dimensional. The uncertainty is then represented by a circle having its center at (xn,yn) and a radius of (rn).

The uncertainty thresholds associated with line segments on the trajectory may be used to synchronize location updates between the moving object and the server. The moving object may send an update to the server if it deviates from its expected location, as determined from the trajectory, by more than the allowed uncertainty. Software running on the device may allow it to perform the necessary computations to determine when it has traveled outside the permissible uncertainty area.

In a preferred embodiment, the wireless device on the moving object is capable of executing a software program. Personal digital assistants are currently equipped to allow users to download and run simple software programs on the device. In addition, some commercially available cellular phones also support user-loaded software programs. These devices typically have less memory and less processing power than a computer, but they are able to run various software programs. The software may be written in a variety of languages, including C, C++ and Java. It is also possible to manufacture a device specifically for this application. This device may have the necessary programs hardcoded into its memory, or it may be capable of executing software programs that are subsequently loaded onto the device.

The software running on the device allows it to be programmed to implement the tracking system. For instance, a device may be programmed to periodically receive trajectory data from the database. The software may also enable the device to compute its anticipated location versus it actual location and to send a location update under given conditions. The device may also be programmed to perform additional functions.

The moving object periodically receives its location information. For example, the device may receive a GPS location update every two seconds. Of course other location systems and other update time periods may also be utilized. Using the update, the device knows its actual location. The device also receives its trajectory from the database. Using the trajectory, the device can interpolate its expected location. The device then computes the distance between its actual and its expected location. If the distance exceeds a determined threshold, the device may send a location update to the database. In a preferred embodiment, the threshold is sent from the database to the device. This allows the database to set and vary the uncertainty allowed by the device. The device may also have the uncertainty threshold programmed in its software or entered by a user, or the device may compute its own threshold. Other methods of obtaining the threshold are also possible.

Figure 5:
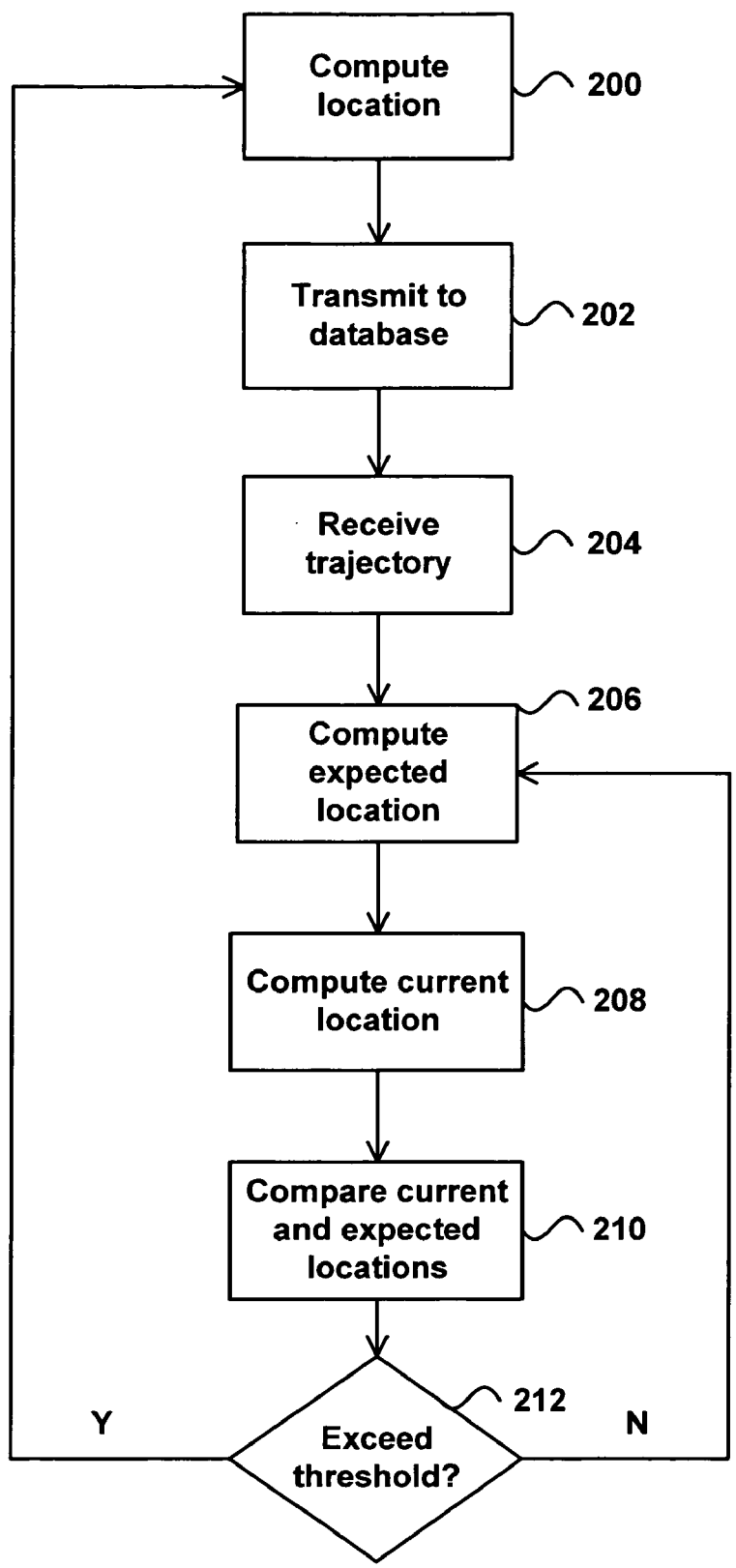
FIG. 5 is a flowchart of one embodiment of a mobile device's operation.

FIG. 5 depicts a flowchart for a device that receives trajectory information from the database. The device begins by obtaining its present location 200. Next, it transmits that location to the moving object database 202. Using the location information, the database computes a trajectory and sends the trajectory to the device. The device receives the trajectory 204, and it uses the trajectory to compute its expected location 206. The device then obtains its current location 208 and compares the current location to the expected location 210. Next the device determines of the difference between the expected location and the current location exceeds a specified threshold 212. If the difference exceeds the uncertainty threshold, the device begins the processes over by obtaining its location 200 and transmitting the location to the database 202. If the difference does not exceed the uncertainty threshold the device returns to Step 206 and continues the process by obtaining another location reading. This flowchart only depicts one possible implementation; other variations and implementations are also possible. In one example of a variation, after determining in Step 212 that it has exceeded the maximum allowable uncertainty, the device transmits the current location computed in Step 208 to the database and proceeds from step 212 to Step 202.

Figure 6:
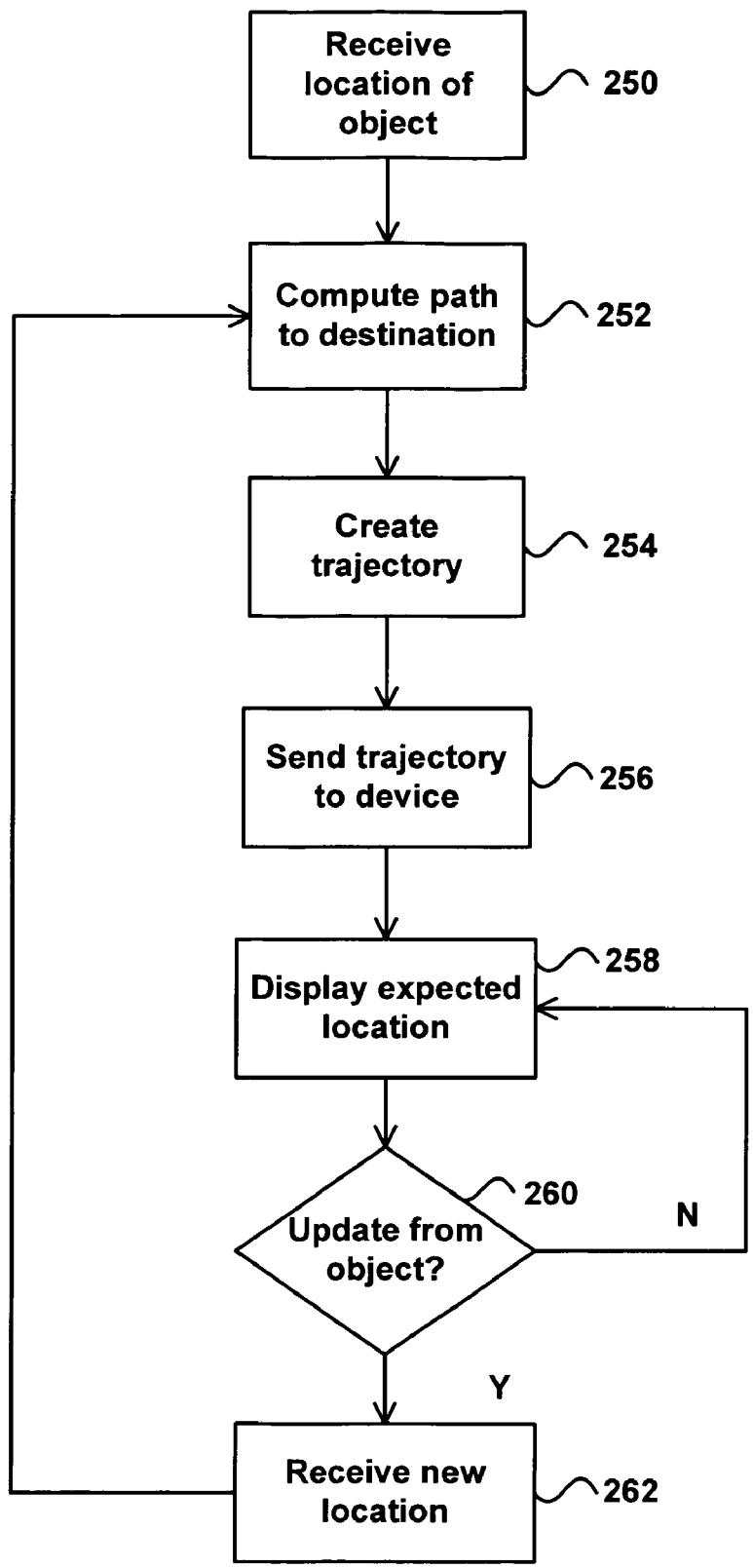
FIG. 6 is a flowchart of one embodiment of the database's operation.

FIG. 6 depicts a flowchart for the database in a system that provides trajectory information to the device. The database receives the location of the object 250. Next, it computes the path between the current location and the destination 252. The database then creates a trajectory for the object 254, which is transmitted to the object 256. The database computes and displays the expected location of the object 258. The database then checks to see if the device is sending it updated location information 260. If the device is sending new location information, then the database receives the location information 262, and it continues the process by computing a new path 252 and trajectory 254. If the object hasn't updated its location information, then the database proceeds from Step 260 back to section 258, and it continues this cycle until the object arrives at its destination or sends new location information. While this flowchart depicts one possible implementation, others are possible and many variations may be made. In one example of a possible variation, Step 258 may be removed so that the database does not display the expected location of the object.

In another embodiment, the device computes its own trajectory. The database system may receive location information from the device and compute a trajectory. Instead of sending the trajectory back to the device, the database system may send the device a map or a section of the map. Using the map, the device may compute its own trajectory and its own anticipated location. Then the device makes the comparison against its own location and determines when to send a location update to the database system. In another embodiment, the device contains the required map segments. In this case, the device simply provides location information to the database system. It is not necessary that the device receive map or trajectory information back from the database, although it is possible. The device may receive an uncertainty threshold from the database, or it may compute the threshold on its own and transmit it to the database.

Figure 7:
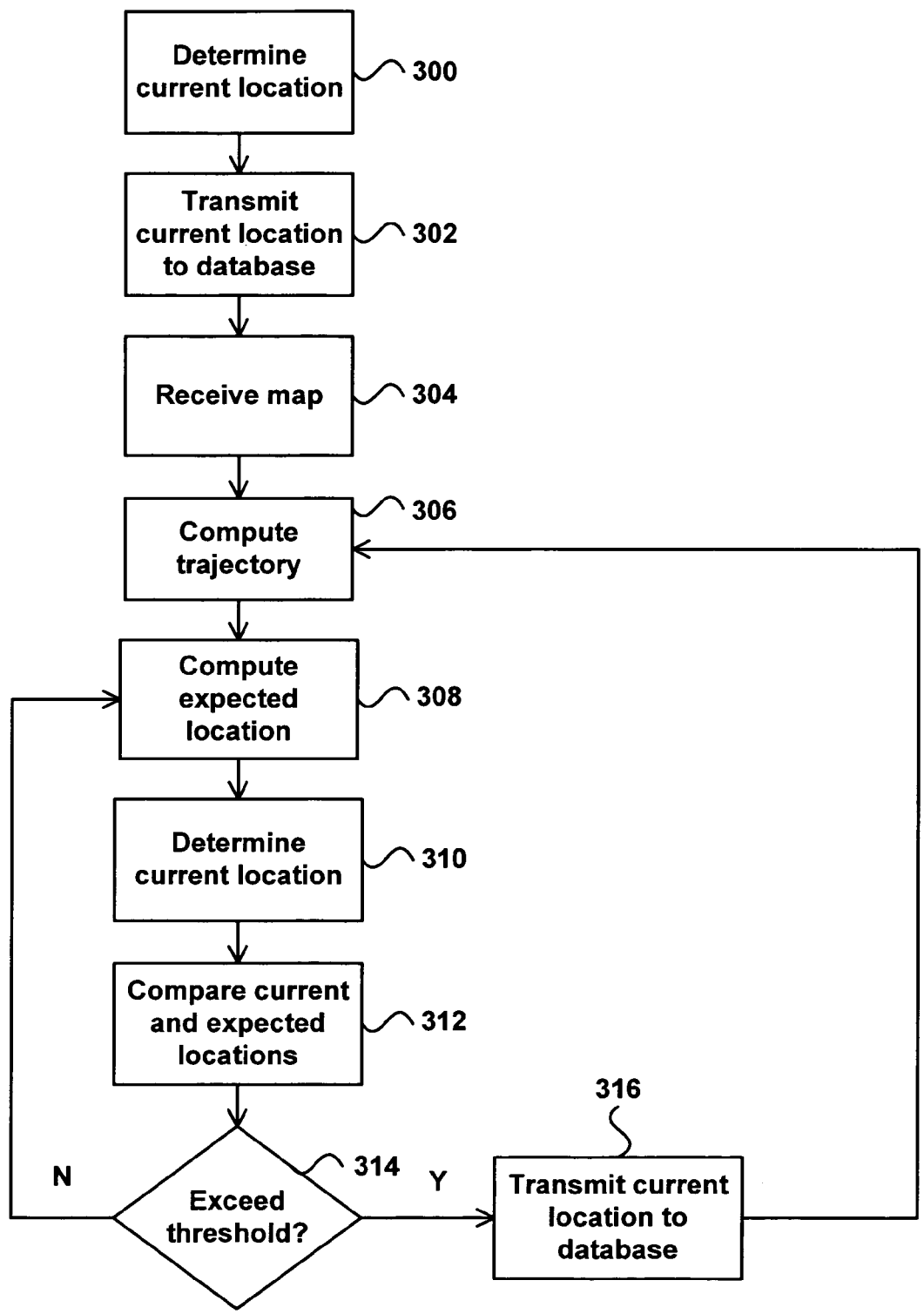
FIG. 7 is a flowchart of an alternate embodiment of a mobile device's operation.

FIG. 7 illustrates a flowchart for a device that receives map information from the database and computes its own trajectory. The device determines its current location 300, and it transmits that location to the database 302. The device then receives a map from the database 304, and it uses the map to compute its trajectory 306. The device then computes it expected location 308 and determines its actual location. Next, it compares its expected location to its actual location 312. At Step 314 the device determines whether it has exceeded the maximum allowable uncertainty threshold. If the device has not exceeded its threshold it then it returns to Step 308 and continues the process. If, however, the device has exceeded the uncertainty threshold, then it proceed from Step 314 to Step 316 where it transmits its current location to the database. From Step 316 the device returns to step 306 and continues the cycle. This flowchart only depicts one possible implementation. Other implementations and variations to the process depicted in the flowchart are possible.

In another embodiment, the database and the moving device use a remote site to compute the path. The database receives the location and destination information for the moving object. Then, the database sends the information to a remote site, which computes the object's path and sends the path back to the database to be used in computing the trajectory. The trajectory can be sent to the mobile device, or the mobile device may similarly compute its own trajectory. For instance, the mobile device can also send the location and destination information to a remote site, which computes the path and sends the path back to the mobile device. The mobile device uses the path it receives to compute its trajectory. It is preferred that the database and the mobile device use the same remote site, so that they both obtain the same path, and, thereby, compute the same trajectory; however, it is possible that they use different sites and receive different paths.

The uncertainty thresholds may be obtained by various methods. One method sets the uncertainty threshold based on the maximum error-tolerance in queries. In this method, a maximum error value is set for the results of the queries. Then the maximum values of the uncertainties of the inputs are determined so that the error of the resulting query doesn't exceed the maximum allowable value.

A preferred method sets the uncertainties using a cost optimization function. The cost optimization function may balance many factors, including bandwidth and imprecision. It may also take into account factors such as the behavior of past deviations, the message cost, the number of expected queries and the probability of disconnect. Other factors may also be considered. The cost optimization function may be altered to compensation for changing conditions. For instance, if the wireless network is slow and supports many devices, then rapid location updates may not be practical. In this case the cost function may be altered to allow more imprecision and not to request as many updates. However, if the wireless network is fast, then it may be practical to design the cost function to tolerate a low uncertainty in locations at the expense of requiring more frequency location updates. The particular cost function used by the database may be static while it tracks a series of moving objects, or the system may modify the cost function during the system's operation.

Given a planned trajectory and an actual trajectory, in order to maintain a lower level of uncertainty the moving object needs to issue more updates. This creates a tradeoff between communication cost and uncertainty. A cost-based approach may be used to determine the appropriate uncertainty parameter r for the system. The information cost of a moving object's trip has two components.

The first component is the query imprecision cost. The uncertainty implies a cost, because a higher uncertainty conveys less information when answering a query concerning the object's trajectory. The cost of the uncertainty depends on the size of the uncertainty and the number of queries that are issued during the trip. The penalty for each unit of uncertainty per one query is $Cq$. The value of the uncertainty radius is r, and the average number of queries per time unit during $[ta,tb]$ is Q. Then the total cost of the uncertainty during the trip is $f(t)=Cq*r*Q*(tb-ta)$, where $(tb-ta)$ is the time of the trip.

The second component is the update data cost. The update cost Cu, is a nonnegative number representing the cost of a location-update message sent from the moving object to the database. The update cost may differ from one moving object to another, and it may even vary for a single moving object during a trip, due to, for example, changes in the availability of bandwidth. If N is the average number of updates per time unit during the trip, then the total update cost during the trip is defined by $g(t)=Cu*N*(tb-ta)$.

The total information cost of a trip, denoted $COST(ta,tb)$ is the sum of the total uncertainty cost and the total update cost. Therefore, $COST(ta,tb)=Cq*r*Q*(tb-ta)+Cu*N*(tb-ta)$. The optimal value of r may be found by quantifying the relationship between N and r. A heuristic function may be used to take an inverse-proportional dependence between N and r, i.e. $N=K/r$ where K is a nonnegative integer. K can be given based on an archive of historical trips. For example, by using the values of N and r for each trip in the archive, K can be derived using linear regression based on the values of N and $1/r$. The optimal value of r in this case is given by the following formula:

$$r=\text{square\_root}((Cu*K)/(Cq*Q))$$

Business considerations may also be used to set the uncertainty threshold. For example, it may be required that the location of the repair crew is known with an uncertainty that does not exceed 3 miles. A lower uncertainty may be desirable if the extra communications cost justifies it, but an uncertainty of 3 miles is the maximum tolerable uncertainty. A cost function may then be designed that balances other factors. The balancing may return an uncertainty that doesn't exceed 3 miles. In this case, the cost function's uncertainty is used. The balancing of factors, however, may yield an uncertainty that exceeds three miles. The resulting uncertainty must then be limited to a ceiling of 3 miles.

One skilled in the art will recognize that many other ways exist to determine the uncertainty threshold.

The moving object may update its uncertainty threshold at each location update. For a location update, the database recomputes a new trajectory, and it sends this trajectory back to the devices. Along with the trajectory, the device may also receive a new uncertainty. The device determines how far it has strayed from its estimated course and uses the new uncertainty to decide if it should provide updated location information to the database. The new uncertainty may be a result of a recomputed trajectory, it may be a result the database using a different cost function; it may be a result of the behavior of the deviation; or it may be a result of other factors or a combination of factors.

In another embodiment, the device is not capable of running its own software. This may prevent the device from receiving information from the database system and from determining when to send a location update. It may also prevent the device from establishing a connection with the database system and sending location updates at all. These devices, however, may still be used in the tracking system.

For example, the FCC has mandated that all wireless carriers offer a 911 service with the ability to pinpoint the location of callers making emergency requests. This has caused many wireless carriers to upgrade their infrastructures to provide location data about mobile devices. This may be done through GPS, triangulation or other methods. The mobile devices may not be capable of running software code or providing their location to 3d parties; however, it may be possible to obtain the location information of a mobile device from the wireless carrier. This may be done, for example, by completing an authorization with the wireless carrier allowing it to provide the location information to the database system. The database system may then receive periodic updates from the wireless carrier as to the device's location. By knowing the device's destinations, the database system can compute an appropriate trajectory. The uncertainty of the device's location may be greater than for a programmed device, because the database system may only receive periodic location updates at a fixed frequency.

In yet another embodiment, the destination of an object may not be known. This may prevent the database system of computing a trajectory based on the object's present location and its destination, because its destination is unknown. The system, however, may use dead reckoning to establish a trajectory for the object. Under this implementation, an object is presumed to continue on a straight course or on the same route. The database then computes a trajectory based on this assumption. The device may be programmed to provide a location update when it changes roads, thereby allowing the database to recompute its trajectory. It may also be programmed to provide an update at specified time intervals, to provide an update at specified distance intervals to provide an update based on the uncertainty threshold or to provide an update based on other criteria. In a preferred embodiment, dead reckoning is used for moving object traveling on major road segments, while periodic updates are used for moving objects traveling on minor road segments. Electronic maps typically divide roads into major and minor categories; however, it is also possible to use other criteria to make the distinction.

At the database, the trajectory may be maintained by revising it according to location-updates from the moving object. It may also be revised based on real-time traffic conditions. They may be obtained, for example, from commercially available traffic websites. Traffic websites typically monitor current traffic conditions for delays, which may be caused by accidents, rush hour or other circumstances. The information may then be used to update the travel times of various road segments affected by the conditions. It is possible to obtain the updated travel time information and input it into the database. This allows the database to adapt to real-time conditions.

A traffic incident model and a method of identifying the trajectories affected by traffic incidents may be used. For example, an object is scheduled to pass through highway section X twenty minutes from now, and a traffic website currently reports a traffic jam on highway section X. This may affect the object's expected arrival time at the destination. The effect depends on whether the traffic jam clears by the time the van arrives at highway section X. Historical information and a traffic model can be used to predict how long the traffic incident will last.

Certain traffic incidents may occur periodically. For instance, rush hour may cause a slow down Monday through Friday during a general timeframe. A model may then be created to estimate the length of this reoccurring delay. For instance, it is possible to measure the length of the delay over a period of time. The delays may then be averaged to produce an estimate of the delay used during the operation of the database system.

In another case, the traffic incidents may be accidents, which are not periodically reoccurring; however, it is still possible to develop models to characterize the length of a delay. This may be done, for instance, by obtaining information about past accidents. This information can be obtained from a variety of sources, including a regional Department of Transportation. The information generally includes the location of an accident, the length of any delay caused by the accident and the seriousness of the accident. A model may be created, for example, by averaging the length of the delay caused by each type of accident. This model can then be applied in real-time to estimate the length of a delay caused by an accident. Once the location and the seriousness of an accident is known, the database can use the model to estimate the duration of the delay caused by the accident. The location and severity of an accident may be obtained, for example, from the data stream of a real-time traffic website.

In a preferred embodiment, the traffic incident is a three-piece linear function, which gives the speed on block i as a function of time since t when the incident occurs. The first piece is a build-up interval, which models the slowdown in traffic speed caused by the incident. The second piece is the pair of points (v,t), (v,t+tp) where v is the traffic speed at time t. [t, t+tp] is the persistent time interval. The third piece is (v,t+tp), (vj, t+tp+tr) where vj is the speed of block i in the jth time period for which $Tj<=t<Tj+1$. [t+tp, t+tp+tr] is the recovery time interval. The build-up interval may be a mirror image of the recovery interval, or it may be different.

Figure 8:
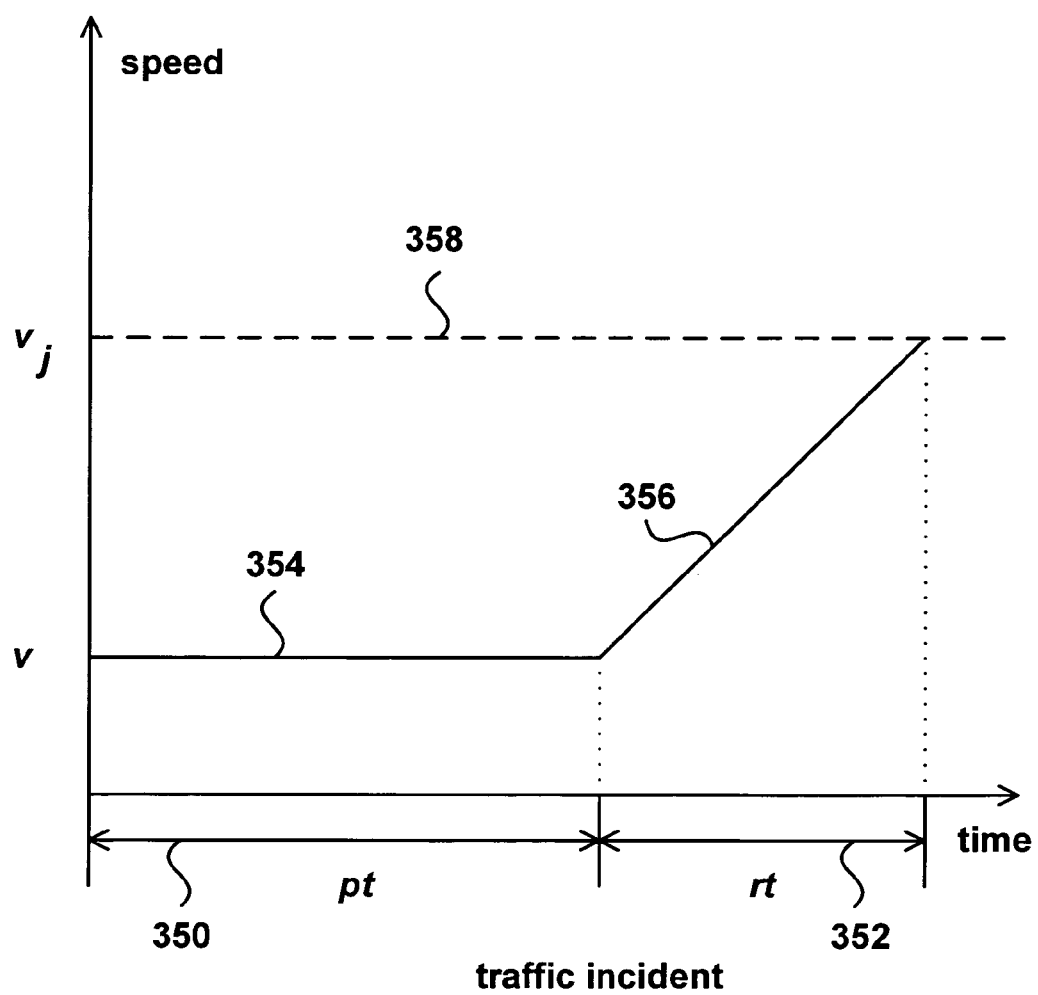
FIG. 8 shows a graphical representation of a traffic incident model.

FIG. 8 illustrates a traffic incident model. The traffic incident shows two phases, the persistent interval 350 and the recovery interval 352. The build-up interval is not shown. In the persistent interval 350 the traffic speed is a constant value, shown by line 354. During the recovery interval 352 the speed recovers to the normal speed at a constant rate. Dashed line 358 depicts the normal speed, while line 356 shows the linearly increase speed during the recovery interval 352. In addition to the traffic incident model depicted in FIG. 7, there are two specialized traffic incidents.

Figure 9:
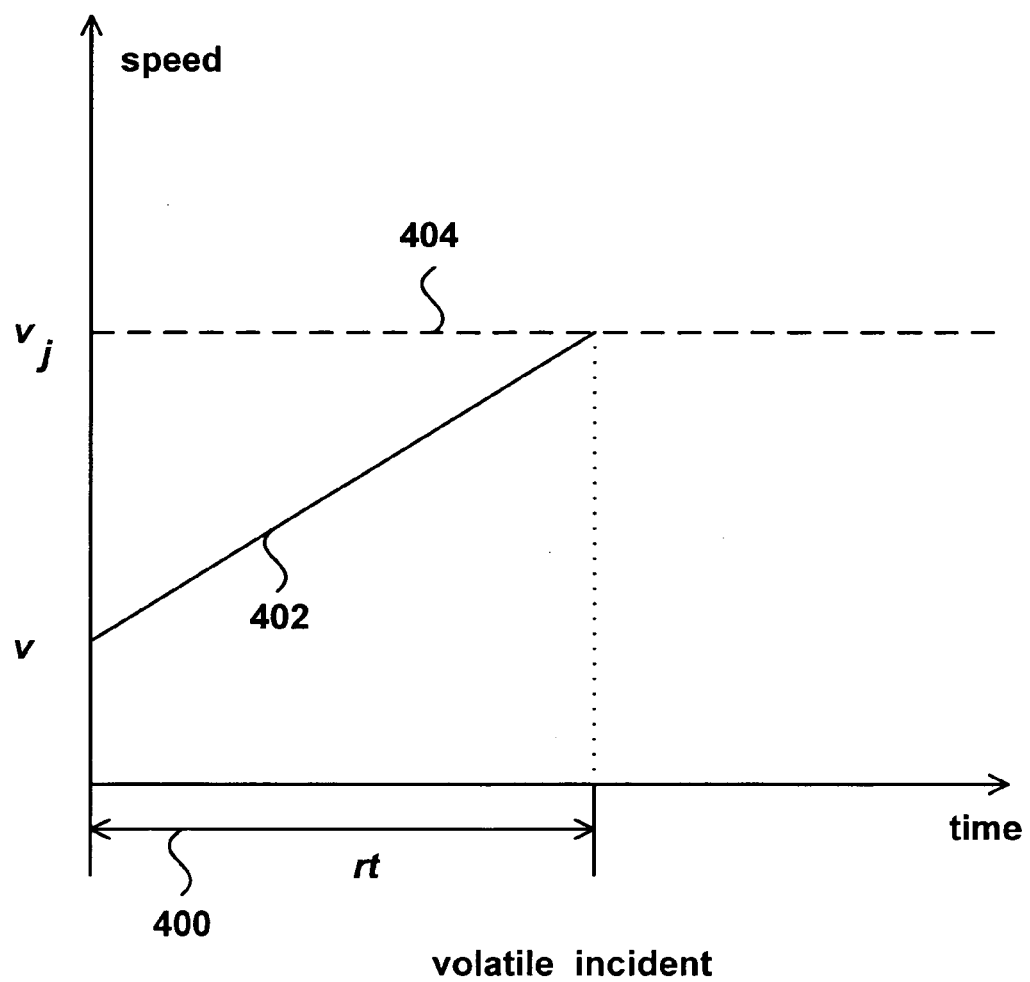
FIG. 9 shows a graphical representation of a volatile traffic incident.

FIG. 9 shows the first specialized traffic incident model. It has a persistent interval of length zero (not shown). The zero length persistent interval means the incident is modeled as beginning to recover immediately after it occurs. Line 402 shows the linear increase in speed during the recovery interval 400. Dashed line 404 represents the normal speed on the length, and at the end of the persistent interval 400 the speed has returned to normal. This type of model is termed a volatile incident. A volatile incident may occur when, for example, a small accident happens and the damaged cars are quickly removed off the road.

Figure 10:
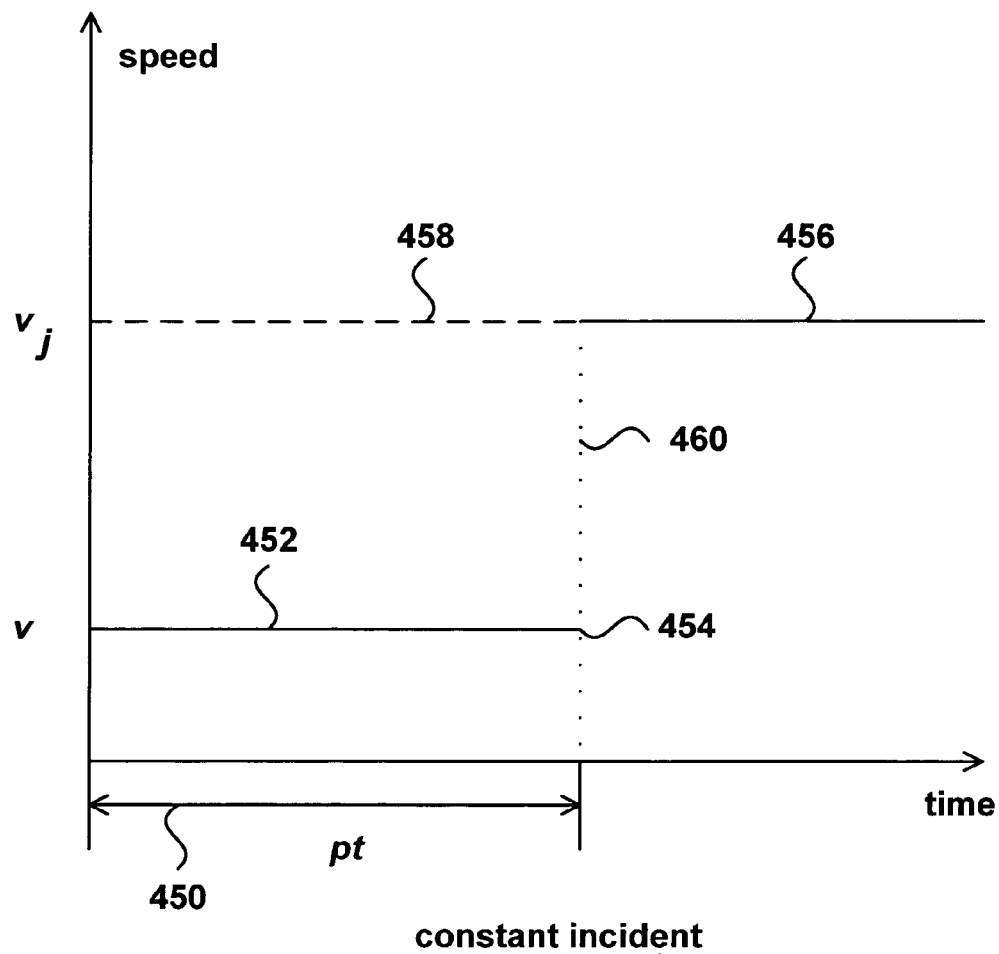
FIG. 10 shows a graphical representation of a constant traffic incident.

The second kind of incident is a constant incident, depicted in FIG. 10. In this model the incident persists for a certain amount of time and recovers suddenly. The constant speed during the persistent interval 450 is indicated by a first solid line 452. At the end of the persistent interval 450 the speed is still at velocity v, shown generally at point 454. A dashed line 460 indicates the end of the persistent interval 450. A second solid line 456 illustrates the increased speed for times after the persistent interval 450. A constant incident may occur when there is construction occurring on a section of road. During the construction, the speed limit may be decreased on a section of road. At the end of the construction the speed increases to its normal level, and the traffic incident can be modeled as suddenly recovering.

In one embodiment, the traffic incident models are developed using data from various accidents. The data from various traffic incidents is divided into classes. Different classes are used for different levels of seriousness of accidents, rush hour conditions or another occurrences. Each data set in a class is analyzed to compute its persistent and recovery intervals. The data sets are then averaged to create one traffic incident model for each class. One skilled in the art will recognize that there are many additional ways to model and account for traffic incidents.

When a traffic incident is reported to the database, it selects the appropriate traffic incident model to use in recomputing trajectories. If a trajectory does not include the section having a traffic incident, then it may not need to be updated. If the object's route includes the affected traffic incident area, then its trajectory still may not need to be updated if the traffic incident recovers before the object reaches that segment. If however, the object reaches the segment before it recovers, the object's trajectory may need to be updated.

In spite of the traffic incident, the object may stay on the same path. In this case, the trajectory is updated taking into account the change in travel time caused by the incident. This may occur, for example, when the trajectory is computed using the shortest distance between the starting location and the destination. In another case, a new trajectory is computed. The new trajectory will be computed taking into account the traffic incident and the changes in travel time caused by the persistent and recovery intervals of the traffic incident model.

The use of a trajectory and an uncertainty threshold to track a moving object has additional benefits over point location management. In trajectory location management the location of a moving object can be computed with a high degree of precision, using a small number of location updates, or no updates at all. If the moving object is "on schedule", i.e., it does not deviate from it prescribed trajectory by more than the uncertainty threshold, then the object may provide not location update and consume no additional resources associated with a location update. Trajectory location management allows the implementation of complex queries that are not supported under point-location management systems.

Database Operators

The location information is obtained and stored in the database for the moving object the system is tracking. This information is used to create trajectories for each of the moving objects. A user of the system may wish to run various queries on the data. The trajectory management system supports many different types of queries that are not available under a point-management implementation.

In an example implementation, the database system may be employed by dispatchers to track the location of police cars. A dispatcher may need to know which police officers are currently within one mile from the location of an emergency. To perform this query in a point location management system, all the objects are polled for their location. This results in a bandwidth utilization spike, and objects that are disconnected from the network are not identified—even if they are within the range. In a trajectory management system, some objects may need to be polled, but the number of polled objects is smaller than in point location management.

Since in the trajectory location management method there is an uncertainty associated with the location of each police car, the dispatcher would run a query that asks: "which police cars may be within one mile of the location?" The retrieved set of objects may be divided into two parts. The first part is the set of police cars that are definitely within one mile, and the second part is the set of police cars that are possibly within one mile. For example, a police car may have an expected location within 0.8 miles of the emergency. If its uncertainty threshold is 0.2 miles or less, then the police car satisfies the condition. If its uncertainty threshold is greater than 0.2 miles, then it possibly, but not necessarily, satisfies the condition. Objects that possibly, but not necessarily, satisfy the condition are polled to more accurately determine their position. The status of objects that are disconnected will not be known, but since the polled set of objects is smaller, the disconnection problem is not a great as in point location management.

New operators may be implemented to access the database. The operators query the database, and they express when/where questions in an uncertain environment. They can be incorporated into the traditional SQL query language, which has been widely adopted by many commercial database systems. Queries can also combine traditional database conditions with the new operators. For example, using the new queries, a dispatcher can run the query: "retrieve the service-personnel who have Qualification='ds1' AND will be within 1 mile of 851 S. Morgan St. at 5 pm." This also means that the operators can be combined using Boolean operators such as AND and OR. A user can enter these operators/queries on a client computer, and the same set of operators can be invoked for a program. The latter option enables development of complex spatial and temporal applications.

Two operators, WHERE_AT and WHEN_AT, are defined for point queries.

WHERE_AT(trajectory Tr, time t). This operator returns the location of the object currently, or at an arbitrary time t. If the current location of the object is requested, then the maximum tolerable uncertainty u can also be specified. If the current location uncertainty associated with object o in the database is higher than u, then the server contacts the object wirelessly to get its exact current location. This operator may be used, for example, when a dispatcher needs to assign a job to a mobile service employee. The job need to be done at time t, and the dispatcher needs to know where the technician is expected to be at that time according to the current schedule.

WHEN_AT(trajectory Tr, location 1). This operator returns the times at which the object on Tr is at location 1. The answer may be a set of times, because the object may pass through the same location more that once. If the location 1 is not on the route of the trajectory, the query may determine all the points on the trajectory that are closest to 1. The query then returns the times at which the object will be at the points closest to 1.

In one embodiment, the WHERE_AT operator is implemented in O(log n) time using a binary search algorithm, where n is the number of line segments of the trajectory. The WHEN_AT operator is implemented in linear time by examining each line segment of the trajectory. Other ways also exist to implement the queries.

Another type of query that may be developed is a spatio-temporal range query. In this type of query the operators are a set of conditions, and the conditions may be satisfied if a moving object is inside a given range R, during a given time interval [t1,t2]. A user may specify the range, for example, by drawing an appropriate region on a map displayed by the database system. The region may be specified by manually entering coordinates into the database system or by other methods.

The spatio-temporal query has multiple operators that account for the changing location of the moving object. For instance, the condition may be satisfied sometime or always within the time range. The object may satisfy the condition everywhere or somewhere in the range. Due to the uncertainty, the object may possibly satisfy the condition, or it may definitely satisfy the condition.

In the following descriptions, the region is represented by a static convex polygon. Tr is a trajectory of the form (x1,y1,t1) . . . (xn,yn,tn), and r is an uncertainty threshold. For each point (x,y,t) along T, its uncertainty area is a horizontal circle with radius r centered at (x,y,t), where (x,y) is the expected location at time t, which is an element of [t1,tn]. The Possible Motion Curve $PMC^T r$ is any continuous function $f_{PMC}{}^T{}_r$: Time→$R^2$ defined on the interval [t1,tn] such that for any t that is an element of [t1,tn], $f_{PMC}{}^T{}_r$ is inside the uncertainty area of the expected location at time t. Given an uncertainty trajectory (Tr,r) and two end-points $(x_i, y_i, t_i)$, $(x_{i+1}, y_{i+1}, t_{i+1})$ that are elements of Tr, the trajectory volume of Tr between $t_i$ and $t_{i+1}$ is the set of all points (x,y,t) such that: (x,y,t) belongs to a possible motion curve of Tr and $t_i <= t <= t_{i+1}$. Given a trajectory, Tr, and an uncertainty threshold, r, the trajectory volume of (Tr,r) is the set of all trajectory volumes between $t_i$ and $t_{i+1}$. The 2D projection of the trajectory volume is the uncertainty zone. VTr denotes the trajectory volume of a given uncertainty trajectory T=(Tr,r) between t1 and t2.

POSSIBLY_SOMETIME_INSIDE(T,R,t1,t2). This query is true if and only if (iff) there exists a $PMC^T$ and there exists a time, t, that is an element of [t1,t2] such that at time t the $PMC^T$ is inside the region R. The truth of the predicate means that the moving object may take a possible route, within its uncertainty zone, such that the particular route will intersect the query polygon R between times t1 and t2.

SOMETIME_POSSIBLY_INSDE(T,R,t1,t2). This query is true iff there exists a time t that is an element of [t1,t2] and a possible motion curve $PMC^T$ of the trajectory T, which at time t is inside the region R. This operator is semantically equivalent to POSSIBLY_SOMETIME_INSIDE.

POSSIBLY_ALWAYS_INSIDE(T,R,t1,t2). This is true iff there exists a possible motion curve $PMC^T$ of the trajectory T which is inside the region R for every t in [t1,t2]. In other words, the motion of the object is such that it may take (at least one) specific 2D possible route, which is entirely contained within the polygon R during the whole query time interval.

ALWAYS_POSSIBLY_INSIDE(T,R,t1,t2). This is true iff for every time point t that is an element of [t1,t2] there exists a $PMC^T$ which will intersect the region R at t.

ALWAYS_DEFINITELY_INSIDE(T,R,t1,t2). This query is true iff at every time t that is an element of [t1,t2], every possible motion curve $PMC^T$ of the trajectory T is in the region R. In other words, no matter which possible motion curve the object takes, it is guaranteed to be within the query polygon R throughout the entire interval [t1,t2]. This predicate is semantically equivalent to DEFINITELY_ALWAYS_INSIDE.

DEFINITELY_SOMETIME_INSIDE(T,R,t1,t2). This query is true iff for every possible motion curve $PMC^T$ of the trajectory T, there exists some time t that is an element of [t1,t2] in which the particular motion curve is inside the region R. No matter which possible motion curve within the uncertainty zone is taken by the moving object, it will intersect the polygon at some time between t1 and t2. The time of intersection, however, may be different for different possible motion curves.

SOMETIME_DEFINITELY_INSIDE(T,R,t1,t2). This is true iff there exists a time point t that is an element of [t1,t2] at which every possible route $PMC^T$ of the trajectory T is inside the region R. Satisfaction of this predicate means that no matter which possible motion curve is taken by the moving object, at specific time t the object will be inside the query polygon.

More complex query conditions can be expressed by a composition of the operators. For example, the query "retrieve all objects which are possibly within a region R, always between the times the object A arrives at locations L1 and L2," may be expressed as:

POSSIBLY_ALWAYS_INSIDE(T,R,WHEN_AT(Tr,L1), WHEN_AT(Tr,L2)).

The region R along with the query time-interval [t1,t2] can be represented as a prism Pr in 3d space: Pr={(x,y,t)|(x, y) is an element R and t1<=t<=t2}. Pr is the query-prism. A 3D indexing scheme may be available in the under-lying DBMS. The insertion of a trajectory in the index is done by enclosing, for each trajectory, each trajectory volume between $t_i$ and $t_{i+1}$ in a Minimum Bounding Box (MBB).

The operation of Minkowski Sum, denoted at ++ is described as follows: let P denote a polygon and dr denote a disk with radius r. P++dr is the set of all the points in a plane which are elements of {P union (interior of P) union (the points which are in the "sweep" of dr when its center moves along the edges of P)}. Trx,y denotes the projection of the trajectory Tr between t1 and t2, on the X-Y plane.

POSSIBLY_SOMETIME_INSDE(T,R,t1,t2)—Sample Algorithm
1. Construct the Minkowski sum of R and the disk dr with radius r, where r is the uncertainty of T. Denote it R++dr.
2. If Trx,y ∩(R++dr)=null between t1 and t2
3. then return false;
4. else return true.

ALWAYS_POSSIBLY_INSIDE(T,R,t1,t2)—Sample Algorithm
1. Construct the Minkowski sum of R and the disk dr with radius r, where r is the uncertainty of T. Denote it R++dr.
2. If Trx,y lies completely inside R++dr
3. then return true;
4. else return false.

The algorithm for this operator is the same as for ALWAYS_POSSIBLY_INSIDE.

DEFINITELY_ALWAYS_INSIDE(Tr,R,t1,t2)—Sample Algorithm
1. For each segment [t1$_i$,t1$_{i+1}$] of Tr, between t1 and t2
2. If the uncertainty zone of the segment is not entirely contained in R;
3. then return false and exit;
4. EndFor;
5. return true.

SOMETIME_DEFINITELY_INSIDE(Tr,R,t1,t2)—Sample Algorithm
1. For each segment [$t_i$,$t_{1+1}$] of Tr such that Trx,y ∩R !=null
2. If R contains a circle with radius r centered at some point on Trx,y,
3. Then return true and exit;
4. EndFor,
5. EndFor;
6. return false.

DEFINITELY_SOMETIME_INSIDE(T,R,t1,t2)—
Sample Algorithm

PTr is the uncertainty zone of the trajectory (equivalently, the 2D projection of VTr, the uncertainty volume). PTrr is PTr with the uncertainty areas at t1 and t2 eliminated. L is the boundary of PTrr. L has at most 2k line segments and k+1 circular segments (at most one around the endpoints of each segment). Lprime=L\D, where D denotes two half-circles which bound the uncertainty areas at t1 and t2. Clearly Lprime has two disjoint "lines" l1 and l2 which are left from the initial boundaries of the uncertainty zone. Using these definitions, an algorithm can be developed 1. If there exists a path P between a point l1 and one on l2 which consists entirely of edges R (or parts thereof) AND P is entirely in PTrr
2. then return true and exit;
3. return false.

The previously discussed algorithm implementations apply to convex polygons. It is also possible to specify a circular region. The circular region may be implemented by approximating it as a convex polygon. The approximation can be accurate up to an arbitrary precision by increasing the number of sides in the polygon. These algorithms can also be applied to certain concave polygonal regions; however, the Minkowski sum, when applied to a concave polygon, may produce a resulting 2D region that is not simple. For these polygons, significant time points may be used to specify the finite set of horizontal planes where the verification of the predicate is not performed. This is similar to the notion of the sweep lines in computational geometry.

Other operators may also be implemented. The algorithms for these operators may be developed similarly to those previously described.

POSSIBLY-WITHIN [distance d|travel-time t] from R, sometime in the time interval T. This condition is satisfied by the objects which are at distance at-most d or travel time at-most t from R, sometime in the time interval T. The time interval may indicate currently. This operator is used, for example, when a dispatcher needs to assign a job R to a technician. The job needs to be done in the time-interval T. The dispatcher needs to know which technicians are expected to be within distance d or travel-time t from R within the time interval T. Since there is an uncertainty associated with the location at each object at each point in time, the condition retrieves the objects that are possibly within-sometime.

DEFINITELY-WITHIN [distance d|travel-time t] from R, sometime in the interval T. The difference between this operator and the previous operator is the certainty quantifier. This operator retrieves the objects that are definitely within-sometime. The dispatcher may use this operator when many technicians are possibly within-sometime. To narrow the search, the dispatcher is interested in the ones that, according to the current schedule, definitely satisfy the condition.

POSSIBLY-WITHIN [distance d|travel-time t] from R, always in the time interval T. For example, the police dispatcher may need to know which patrol cars will stay in the region R for the whole duration T.

DEFINITELY-WITHIN [distance d|travel-time t] form R, always in the time interval T. This is a combination of operators 2 and 3. This may be used, for example, when a police dispatcher needs to know which patrol cars will definitely stay in the region R for a whole duration T, according to the current schedule.

POSSIBLY-DURING time interval T, everywhere in R. This would represent which police cars will possibly cover the whole region R during interval T.

DEFINITELY-DURING time interval T, everywhere in R. This would represent which police cars will definitely cover the whole region R during the interval T.

POSSIBLY-CLOSEST-TO (or furthest from) R, sometime in time interval T. This will show which technician is possibly closest to location R sometime during T. Due to the uncertainty and the duration of T, there may be more than a single technician that may be closest to R during the interval. To find out if there is a single technician that will definitely be the closest, then the next operator should be used.

DEFINITELY-CLOSEST-TO (or furthest from) R, sometime in time interval T. The operator identifies object o1, o2, etc. . . . such that o1 is definitely closest between times t1 and t2, o2 is definitely closest between times t3 and t4, etc. . . . Due to the location uncertainty there may be time intervals within T for which no single moving object will definitely be the closest.

POSSIBLY-CLOSEST-TO (or furthest from) R, always in time interval T. This would show, for example, which technician is possibly closest to location R always during T.

DEFINITELY-CLOSEST-TO (or furthest from) R, always in time interval T. This operation would be the same as the previous one, except it searches for moving objects satisfying the condition.

Each operator may be implemented in one of two variations. These variations are 1) Along Existing Route (AER) or 2) Along Shortest Route (ASR). For example, the first condition POSSIBLY-WITHIN-SOMETIME may be satisfied with the AER variant for object O, if R is on O's route, and o is within distance d from R while traveling along its predefined route. However, a police dispatcher, for instance, may be interested in the patrol cars that can reach an emergency destination while traveling along the shortest path from their current location to the destination. In this ASR variant, the patrol cars are allowed to abandon their predefined route in order to reach the destination.

POSSIBLY-WITHIN [distance d|travel-time t], sometime in time interval T. The condition is satisfied by the pairs of trajectories that are within distance d or travel time t from each other, sometime in time interval T. This operator is used, for example, in an air-traffic control system that stores the trajectories of planes. We assume that, in contrast to the existing system in which planes fly on "highways in the sky," the new free-flight system has been implemented. An air traffic controller may need to know which planes are expected to be within distance d from each other, thus representing a safety hazard.

An opposite operator may also be implemented.

POSSIBLY-FARTHERTHAN [distance d|travel-time t], sometime in time interval T. This condition is satisfied by the pairs of trajectories which are farther than distance d or travel time t from each other, sometime in time interval T. This operator is used, for example, in a military situation in which a database represents vehicles and aircraft moving as a unit. This operator enables the commander to know if a vehicle moves too far away from the rest of the company.

Some single-trajectory-analysis operators may be applied to pairs of trajectories. For example, WEN trajectory i AND trajectory j are CLOSEST. This operator returns a list of times at which the two trajectories come closest to each other.

Operators and queries may be applied as a trigger. In this capacity an alert message is sent when the condition of the operator is satisfied. For example, the SECTIONS operator may be used with the set of facilities as a list of locations of motel. When used as a trigger, this operator may alert the driver every time he is closest to, or within x minutes drive-time, from a motel. To provide another example, the POSSIBLY-WITHIN-DISTANCE operator may be used as a trigger to send an alert message when the trajectories of two airplanes are too close to each other.

The new operators may be used to set alerts (triggers) that occur when conditions are satisfied by the database. The alerts can notify a user when a query would return a particular result, or when another event occurs. The notifications can correspond to queries that may be implemented using the new operators or to other events. For instance, a user may be notified "if truck X will pass within 5 miles of location Y." The user may be notified by a particular output on the user's display. Other methods, such as sending a wireless message to the user's PDA, pager or cell phone can also be used. A user may also be notified by an email, a voice message or another type of notification.

Triggers may be implemented using continuous queries. Continuous queries are queries that execute continually. Due to performance constraints the queries may not actually be continuously executed, but their frequency may be such that their output appears continuous to a user. The query may execute at given time intervals, or when other events occur. The resulting set of retrieved objects may change as the database changes.

Figure 11:
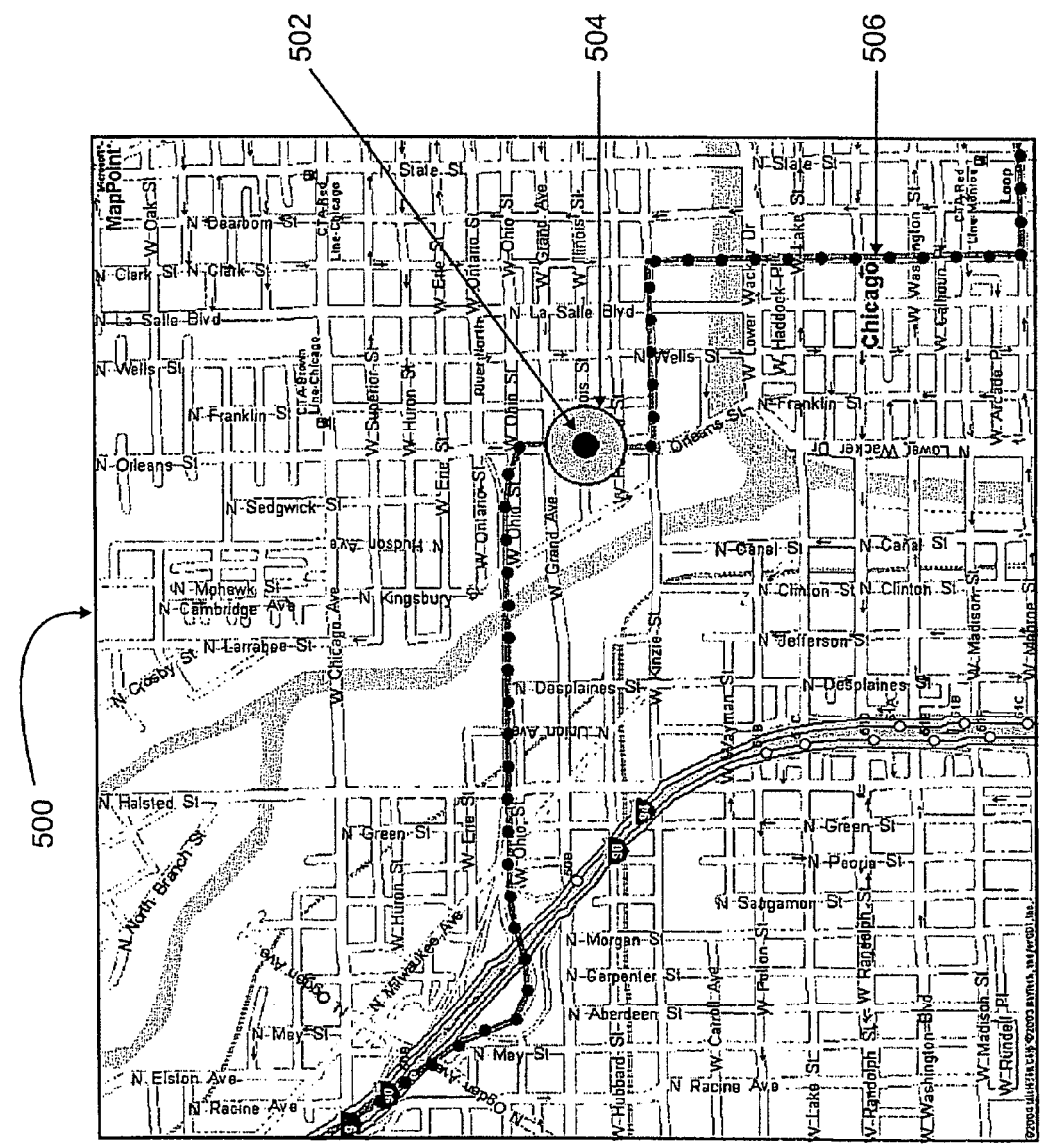
FIG. 11 is a sample graphical output of the system showing a trajectory and an uncertainty for a moving object.

The database system may provide output in a variety of different ways. A display can be attached to a computer in the database system. FIG. 11 shows a sample output. The database outputs a map, shown generally by 500. The map plots a tracked object as a point 502 and the uncertainty as a circle surrounding the point 504. It additionally shows the current trajectory of the object as a darkened line 506 on the map. A user can change the scale of the map by zooming in or out on the display. This allows the user to view the full range of objects tracked by the system, or to see more detailed information about a subset of objects tracked by the system.

The output information may also be sent to remote users. This may be done, for instance, by sending the output over the Internet to another user. The display may be the same as for the terminal attached to the database system, or it may be different. The information sent to the remote user may be altered so that its precision is decreased. For instance, the remote user may only be able to view a less detailed map or may only be allowed to view a map covering a larger area. This decreases the precision of the trajectory shown to the remote user. The output may be sent to multiple users, and the precision of the output sent to the multiple users may be varied among the users. It is also possible to encrypt the data sent to the remote users, in order to provide a higher level of security for the system.

In one embodiment, the database system simultaneously tracks moving objects for multiple companies. The database only allows a particular company to view the trajectories and location of objects from that company. It cannot view the information for other companies. In another embodiment, one company can view the trajectory and location information for the objects from one or more other companies.

In another display format, the database outputs a map and a location of the moving object at a certain time. Then, the user can vary the time and view the corresponding locations of the object. For instance, the user could replay the object's past travel, or the user could watch the projected travel of the object for future times. The database uses the known data points, and then interpolates and extrapolates the locations of the object for the running times. The location of the object on the map is updated as the times change. This is similar to watching the object travel in real-time. The user may fast forward to a new time or rewind replay sections of the travel.

One skilled in the art will recognize that various other output formats also exist. For instance, it is possible to simply output a list of the objects that satisfy a certain query. It is also possible to output a list of destinations and currently estimated arrival times for the moving objects. Other outputs are also possible.

Example Database System Configuration

A mobile object database (MOD) can be implemented in many different configurations. In a preferred embodiment, the MOD provides inheritable abstract data types (ADTs) for moving objects, a set of query operators, methods to define and manipulate the abstract data types, and geodetic and trajectory finding services. When combined with the application tier, the MOD can connect to wireless and World Wide Web (WWW) applications.

Figure 12:
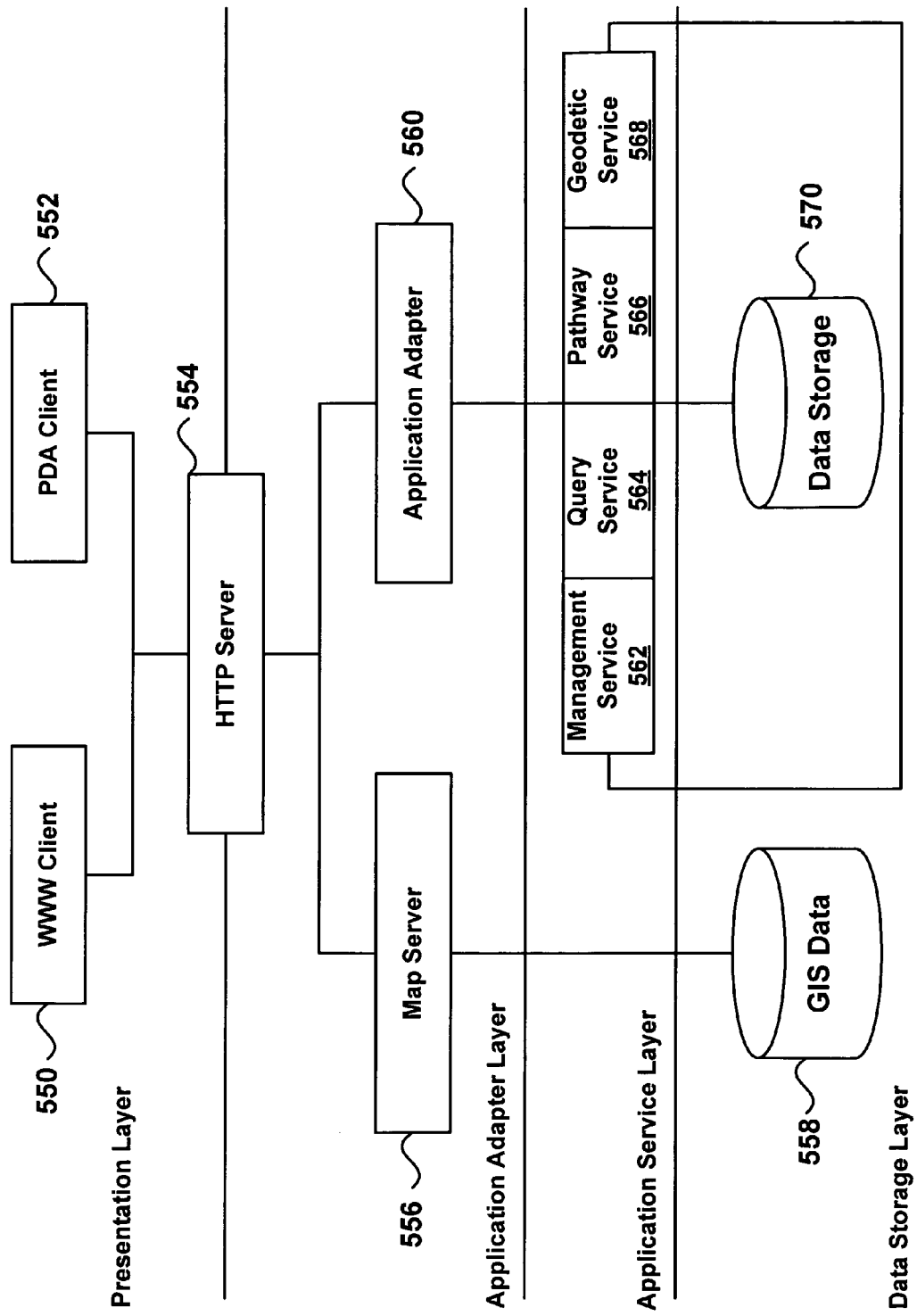
FIG. 12 illustrates a configuration of the database system.

FIG. 12 depicts an exemplary configuration for the database. The database uses two types of clients, a WWW client 550 and a PDA client 552; however, it is possible to use additional or fewer clients. The WWW client 550 monitors moving objects. Users may use the WWW client 550 to query the moving, objects, monitor and review their motion, and communicate with the database or with other devices. It can display a graphical user interface of various queries, and it may provide trajectory visualization, triggers and notifications. Additionally, the WWW client 550 can perform a VCR-like function to playback the motion of moving objects. It also renders the map as background of moving object's motion and provides basic GIS features such as geodetic, label and distance measurement. The WWW client 550 may be a program running on a user's computer specifically designed for use with the database, or it may be an existing program on the user's computer, such as one used to connect to the Internet or to another type of network.

The PDA client 552 handles the interface of the moving objects. Mobile users may use the PDA client 552 to acquire current location information, update the location information, navigate, manage moving plans, monitor moving states or otherwise interface with the database. It may also handle location device management, provide a moving state monitor and synchronize the trajectory between the client and server. Additionally, it can update the trajectory and provide an interface of geodetic services. The PDA client 552 may also provide connectivity to another user or system. It may provide a graphical user interface, which displays data from the device, from the database or from another source. The PDA client 552 can be a software program running on a movable object that provides these or other features. Each movable object may have its own PDA client 552.

In one embodiment, the PDA client 552 communicates directly with the WWW client 550. This may be done through the Internet or through some other type of connection. The PDA client 552 and the WWW client 550 communicate with the database through the HTTP server 554. In a preferred embodiment, the PDA client 552 and the WWW client 550 communicate with the HTTP server 554 through the Internet; however, other connections are possible. The HTTP server 554 may be a software program running on the database that provides connectivity between the other devices and the database.

The map server 556 connects to the GIS data module 558. The GIS data module 558 may be, for example, a hard disk that provides storage for the electronic map information. The map server 556 contains information about the storage structure of the map information stored in the GIS data module 558. It provides an interface between the GIS data module 558 and the clients 550, 552 or other system parts. For example, the map server 556 may translate the data stored in the GIS data module 558 into protocols or formats that can be understood by the clients 550, 552 or other module. Likewise, it may take data and protocols received from the clients 550, 552 or other modules and convert it into the format used in the GIS data module 558.

The application adapter 560 connects with the data storage 570. It provides an interface between the clients 550, 552 and other modules. The application adapter may convert data into protocols or formats that can be understood by the clients 550, 552 or other system parts, and it may convert data from other sources into protocols or formats understood by its subsystems. It may also perform additional functions.

Four services connect to the application adapter 560. They are: the management service 562, the query service 564, the pathway service 566 and the geodetic service 568. These services 562, 564, 566, 568 provide various functions of the database system. The management service 562, for example, may perform functions of the database management system. The query service 564 may be the software subsystem that implements the queries on the data stored in the data storage 570. The pathway service may aid in the interface of the database to the clients 550, 552 and to other software subsystems. The geodetic service 568 may compute the trajectories of moving objects and interface with the map server 556. The services 562, 564, 566, 568 may access the GIS data storage 558 through the map server 556, or alternatively they may access the GIS data storage 558 directly.

While FIG. 12 shows the MOD partitioned into four layers (the presentation layer, the application adaptor layer, the application serviced layer and the data storage layer), it is only one exemplary embodiment. One skilled in the art will recognize the many different ways exist to implement the database system. For instance, the database may be part of one computer system, or it may be partitioned across multiple computers. The GIS data storage 558 and the data storage 570 can be merged into one module. A fewer or greater number of services may be used to provide functionality to the database system. The map server 556 and the application adapter 560 can be merged into one system. Many additional changes can also be made.

An exemplary embodiment of the present invention has been described above. Those skilled in the art will understand, however, that changes and modifications may be made to this embodiment without departing from the true scope and spirit of the present invention, which is defined by the claims.

I claim:

1. A method of providing a notification, the method comprising:
    storing respective trajectories for each of a plurality of moving objects, wherein each respective trajectory defines permissible spatial and temporal uncertainties in actual locations of one of the moving objects relative to expected locations of the moving object along a temporal-spatial path that the moving object travels from a starting location through intermediate locations to a destination location;
    obtaining a condition for one of the moving objects;
    determining that the condition has occurred, wherein the determination is made at least in part by querying the respective trajectory for the moving object; and
    responsively providing a notification that the condition has occurred to a user.

2. A computer readable medium having stored therein instructions for causing a processor to execute the method of claim 1.

3. The method of claim 1, wherein determining that the condition has occurred comprises determining that the condition has become true.

4. The method of claim 1, wherein determining that the condition has occurred comprises determining that the condition has become false.

5. The method of claim 1, wherein responsively providing the notification comprising sending the notification to the user via a wireless communication interface.

6. The method of claim 1, further comprising providing the notification that the condition has occurred to a second user.

7. The method of claim 1, further comprising:
    obtaining a second condition for the moving object;
    determining that the second condition has occurred, wherein the determination is made at least in part by querying the respective trajectory for the moving object; and
    responsively providing a second notification that the second condition has occurred to a user.

8. The method of claim 1, wherein determining that the condition has occurred comprises:
    performing a query on the respective trajectory for the moving object;
    based on a result of the query, determining that the condition has not occurred; and
    repeating the query at least one time, and based on a result of the repeated query, determining that the condition has occurred.

9. The method of claim 1, wherein obtaining the condition for one of the moving objects comprises receiving the condition from the user.

10. A method of providing a notification, the method comprising:
    storing respective trajectories for each of a plurality of moving objects, wherein each respective trajectory defines permissible spatial and temporal uncertainties in actual locations of one of the moving objects relative to expected locations of the moving object along a temporal-spatial path that the moving object travels from a starting location through intermediate locations to a destination location;
    for each of a plurality of moving objects, obtaining a respective condition for the moving object;
    monitoring the conditions of the moving objects to determine if one or more of the conditions occurs;
    determining that the respective condition for one of the moving objects has occurred, wherein the determination is made at least in part by querying the respective trajectory for the moving object; and
    responsively providing a notification that the respective condition for one of the moving object has occurred to a user.

11. A computer readable medium having stored therein instructions for causing a processor to execute the method of claim 10.

12. The method of claim 10, wherein determining that the respective condition has occurred comprises determining that the respective condition has become true.

13. The method of claim 10, wherein determining that the respective condition has occurred comprises determining that the respective condition has become false.

14. The method of claim 10, wherein responsively providing the notification comprising sending the notification to the user via a wireless communication interface.

15. The method of claim 10, further comprising providing the notification to a second user.

16. The method of claim 10, further comprising:
obtaining a second condition for the moving object;
determining that the second condition has occurred, wherein the determination is made at least in part by querying the trajectory for the moving object; and
responsively providing a second notification that the second condition has occurred to a user.

17. The method of claim 10, wherein determining that the respective condition has occurred comprises:
performing a query on the respective trajectory for the moving object;
based on a result of the query, determining that the respective condition has not occurred; and
repeating the query at least one time, and based on a result of the repeated query, determining that the respective condition has occurred.

18. A method of providing a notification, the method comprising:
storing respective trajectories for each of a plurality of moving objects, wherein each respective trajectory defines permissible spatial and temporal uncertainties in actual locations of one of the moving objects relative to expected locations of the moving object along a temporal-spatial path that the moving object travels from a starting location through intermediate locations to a destination location;
obtaining a condition involving at least two of the moving objects;
determining that the condition has occurred, wherein the determination is made at least in part by querying the respective trajectories for the two moving objects; and
responsively providing a notification that the condition has occurred to a user.

19. A computer readable medium having stored therein instructions for causing a processor to execute the method of claim 18.

20. The method of claim 18, wherein determining that the condition has occurred comprises determining that the condition has become true.

21. The method of claim 18, wherein determining that the condition has occurred comprises determining that the condition has become false.

22. The method of claim 18, wherein responsively providing the notification comprising sending the notification to the user via a wireless communication interface.

23. The method of claim 18, further comprising providing the notification to a second user.

24. The method of claim 18, further comprising:
obtaining a second condition involving the two moving objects;
determining that the second condition has occurred, wherein the determination is made at least in part by querying the respective trajectories for the two moving objects; and
responsively providing a second notification that the second condition has occurred to a user.

25. The method of claim 18, wherein determining that the condition has occurred comprises:
performing a query on the respective trajectories for the two moving objects;
based on a result of the query, determining that the condition has not occurred; and
repeating the query at least one time, and based on a result of the repeated query, determining that the condition has occurred.

26. The method of claim 18, wherein obtaining a condition for one of the moving objects comprises receiving the condition from the user.

* * * * *

(12) EX PARTE REEXAMINATION CERTIFICATE (6344th)
United States Patent
Wolfson

(10) Number: US 7,016,781 C1
(45) Certificate Issued: Aug. 5, 2008

(54) METHOD AND SYSTEM FOR QUERYING IN A MOVING OBJECT DATABASE

(75) Inventor: Ouri Wolfson, Highland Park, IL (US)

(73) Assignee: Fluensee, Inc., Englewood, CO (US)

Reexamination Request:
No. 90/008,571, Aug. 3, 2007

Reexamination Certificate for:
Patent No.: 7,016,781
Issued: Mar. 21, 2006
Appl. No.: 11/048,039
Filed: Jan. 31, 2005

Related U.S. Application Data

(63) Continuation of application No. 10/074,903, filed on Oct. 29, 2001, now Pat. No. 6,895,329.
(60) Provisional application No. 60/292,322, filed on May 22, 2001, and provisional application No. 60/243,839, filed on Oct. 30, 2000.

(51) Int. Cl.
*G01C 23/00* (2006.01)
*G01C 21/26* (2006.01)
*G06F 19/00* (2006.01)

(52) U.S. Cl. .................. 701/209; 701/201; 701/205; 701/210; 707/3; 340/988; 340/995.23

(58) Field of Classification Search .................. None
See application file for complete search history.

(56) References Cited

U.S. PATENT DOCUMENTS

| | | | |
|---|---|---|---|
| 5,243,528 A * | 9/1993 | Lefebvre | 701/211 |
| 5,272,638 A | 12/1993 | Martin et al. | |
| 5,414,629 A | 5/1995 | Inoue | |
| 5,787,383 A | 7/1998 | Moroto et al. | |
| 5,911,775 A * | 6/1999 | Tanimoto | 701/210 |
| 5,924,075 A | 7/1999 | Kanemitsu | |
| 5,987,377 A | 11/1999 | Westerlage et al. | |
| 6,009,403 A | 12/1999 | Sato | |
| 6,034,626 A | 3/2000 | Maekawa et al. | |
| 6,067,499 A | 5/2000 | Yagyu et al. | |
| 6,192,314 B1 | 2/2001 | Khavakh et al. | |
| 6,249,740 B1 | 6/2001 | Ito | |
| 6,282,489 B1 | 8/2001 | Bellesfield et al. | |
| 6,298,303 B1 | 10/2001 | Khavakh et al. | |
| 6,314,369 B1 | 11/2001 | Ito | |
| 6,317,686 B1 | 11/2001 | Ran | |
| 6,321,158 B1 * | 11/2001 | DeLorme et al. | 701/201 |
| 6,324,467 B1 | 11/2001 | Machii et al. | |
| 6,339,746 B1 | 1/2002 | Sugiyama et al. | |
| 6,347,278 B2 * | 2/2002 | Ito | 701/200 |
| 6,381,535 B1 | 4/2002 | Durocher et al. | |
| 6,401,034 B1 | 6/2002 | Kaplan et al. | |
| 6,580,904 B2 | 6/2003 | Cox et al. | |
| 6,587,782 B1 | 7/2003 | Nocek et al. | |
| 6,622,084 B2 * | 9/2003 | Cardno et al. | 701/202 |
| 6,707,421 B1 | 3/2004 | Drury et al. | |
| 6,738,710 B2 * | 5/2004 | Nagaki | 701/208 |
| 6,801,850 B1 | 10/2004 | Wolfson | |
| 6,895,329 B1 | 5/2005 | Wolfson | |
| 6,917,877 B2 | 7/2005 | Yang | |
| 6,965,827 B1 | 11/2005 | Wolfson | |
| 6,968,271 B1 | 11/2005 | Wolfson | |

OTHER PUBLICATIONS

Hu Cao et al., Spatio–temporal Data Reduction with Deterministic Error Bounds, DIALM–POMC, Sep. 2003, San Diego, California.

Goce Trajcevski et al., Managing Uncertain Trajectories of Moving Objects with Domino, Proc. of the 4$^{th}$ International Confernce on Enterprise Information Systems, Apr. 2002, Spain.

(Continued)

*Primary Examiner*—Jeanne M. Clark

(57) ABSTRACT

A database receives location information about a moving object. Using the destination of the object and an electronic map, the database finds a projected path for the moving object. From the projected path, the database computes a trajectory. The trajectory may be used to estimate past and future positions of the moving object. The moving object may send location updates to the database when its actual location differs from its anticipated location by more than an uncertainty threshold.

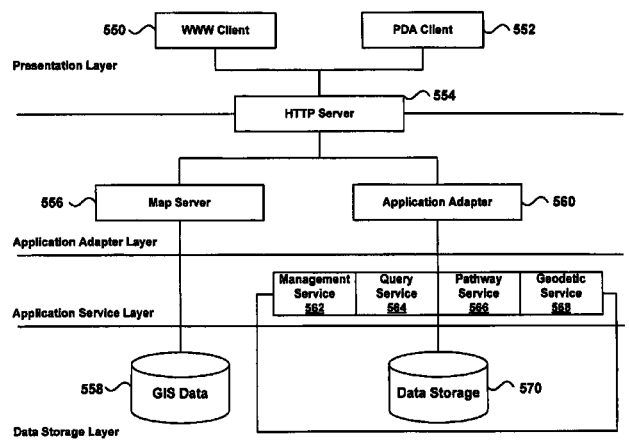

OTHER PUBLICATIONS

Ouri Wolfson et al., Updating and Querying Databases that Track Mobile Units, Distributed and Parallel Databases Journal (DAPD) on Mobile Data Management and Applications, 7(3), 1999, Kluwer Academic Publishers, pp. 257–288.

M. Vazirgiannis et al., A Spatiotemporal Model and Language for Moving Objects on Road Networks, Springer Verlag Lecture Notes in Comp. Sci., No. 2121, Proceedings of the 7th Intl. Symposium on Spatial and Temporal Databases, Jul. 2001, Los Angeles, CA.

Dr. James Snyder et al., New Technologies for Realizing Model–Based Battle Command, Proceedings of the ARL Federated Laboratory 4th Annual Symposium, Mar. 2000, College Park, MD.

Goce Trajcevski et al., Research Directions in Moving Objects Databases, Proceedings of the First International Conference on Geographic Information Science, Oct. 28–31, 2000, pp. 206–207, Savannah GA.

A. Prasad Sistla et al., Minimization of Communication Cost through Caching in Mobile Environments, IEEE Transactions on Parallel and Distributed System, 9(4), Apr. 1998, pp. 378–390.

Ouri Wolfson et al., An Adaptive Data Replication Algorithm, ACM Transactions on Database Systems (TODS), vol. 22(2), Jun. 1997, pp. 255–314.

A. Prasad Sistla et al., Temporal Triggers in Active Databases, IEEE Transactions on Knowledge and Data Engineering (TKDE), vol. 7(3), Jun. 1995, pp. 471–486.

Ouri Wolfson et al., Databases for Tracking Mobile Units in Real Time, Lecture Notes in Computer Science, No. 1540, Proceedings of the 7th International Conference on Database Theory (ICDT), Jerusalem, Isreal, Jan. 1999, pp. 169–186.

Son K. Dao et al., Semantic Multicast: Intelligently Sharing Collaborative Sessions, ACM Computing Surveys, 31(2es):3, 1999.

Ouri Wolfson et al., Moving Objects Databases: Issues and Solutions, Proceedings of the 10th International Conference on Scientific and Statistical Database Management (ISSDBM98), Capri, Italy, Jul. 1–3, 1998, pp. 111–122.

Ouri Wolfson et al., Domino: Databases fOr MovING Objects tracking, Proceedings of the ACM–Sigmond 1999, International Conference on Management of Data, Philadelphia, PA, Jun. 1999, pp. 547–549.

Partial Listing of the Publications of Ouri Wolfson found at http://www.cs.uic.edu/~wolfson/html/ouri_publish.html, downloaded from the World Wide Web on Jul. 3, 2007.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–26 are cancelled.

* * * * *